Aug. 20, 1935.  W. L. MORRIS  2,011,588
VOTING AND BALLOT COUNTING SYSTEM AND APPARATUS
Filed Jan. 13, 1930  9 Sheets-Sheet 3
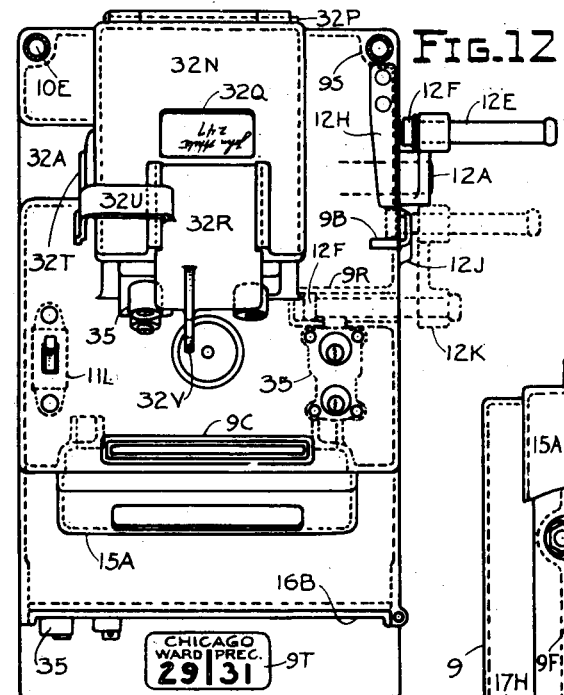
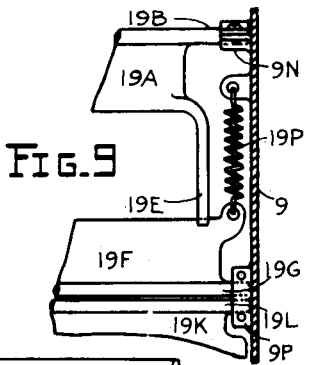
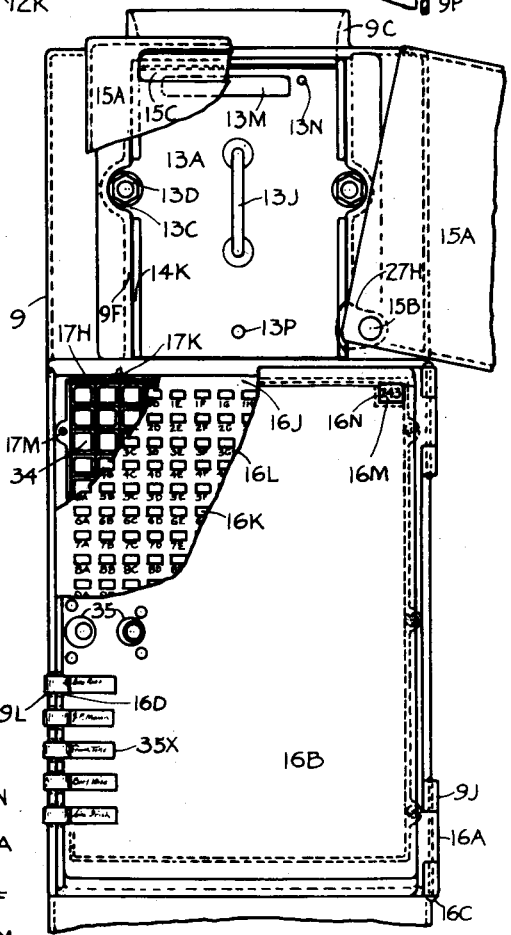
INVENTOR.
William L. Morris
Kent W. Wormell
ATTORNEY Aug. 20, 1935. W. L. MORRIS 2,011,588
VOTING AND BALLOT COUNTING SYSTEM AND APPARATUS
Filed Jan. 13, 1930 9 Sheets-Sheet 4
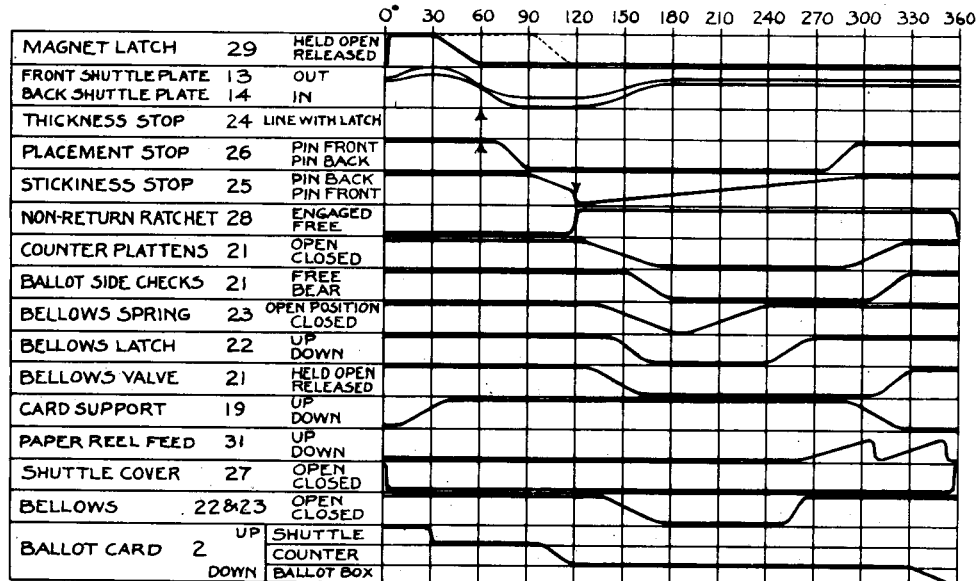
FIG. 4B
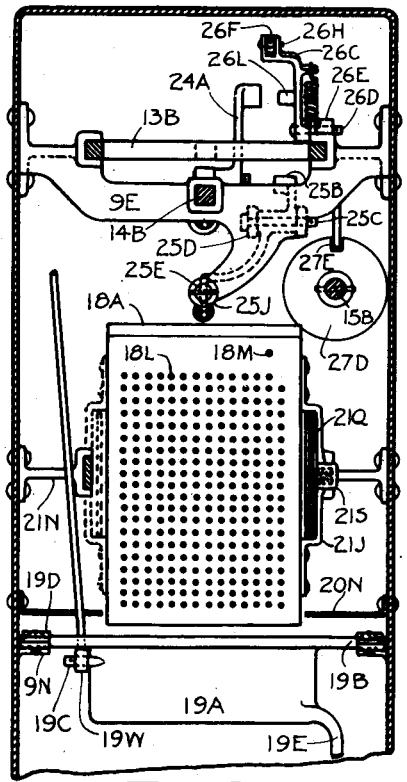
FIG. 14
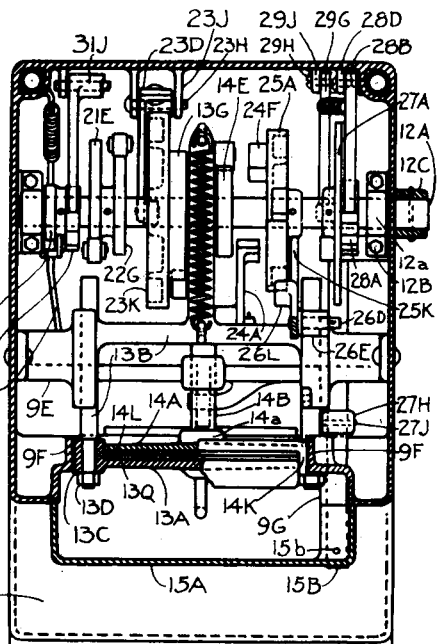
FIG. 15
FIG. 13
INVENTOR.
William L. Morris
Kent W. Womwell
ATTORNEY Aug. 20, 1935.  W. L. MORRIS  2,011,588

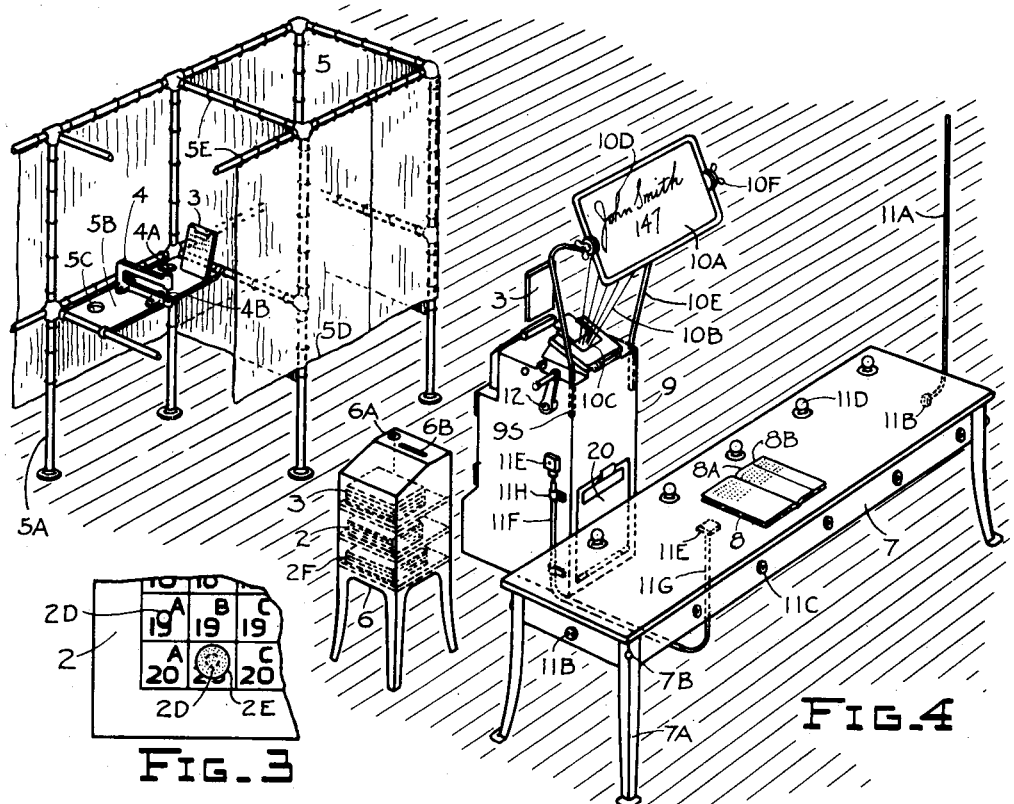

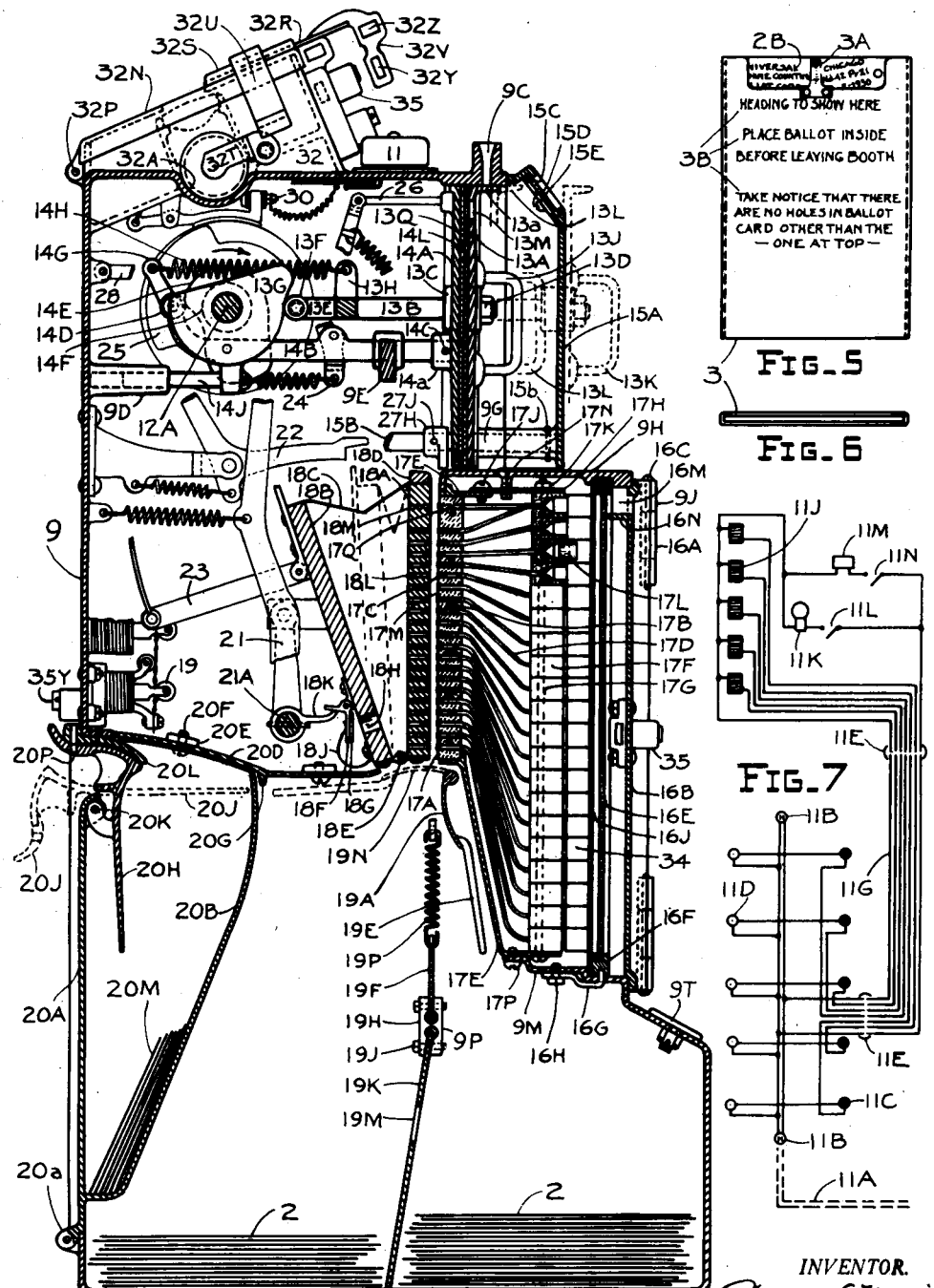

VOTING AND BALLOT COUNTING SYSTEM AND APPARATUS

Filed Jan. 13, 1930  9 Sheets-Sheet 5

INVENTOR.
William L. Morris
Kent W. Wormell
ATTORNEY.

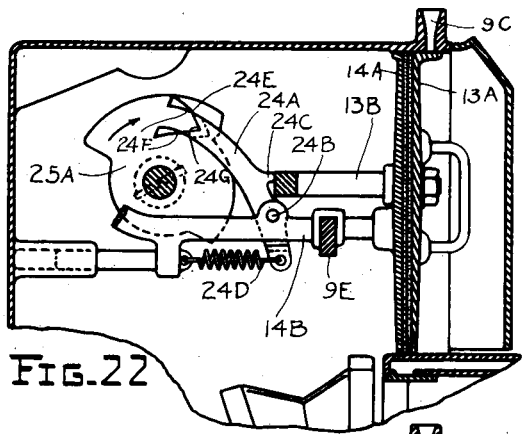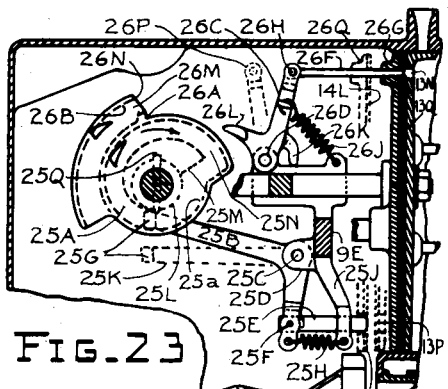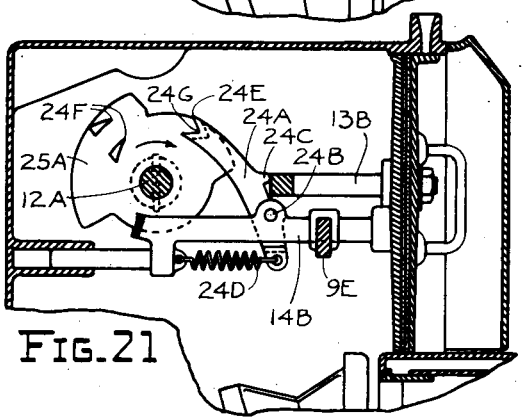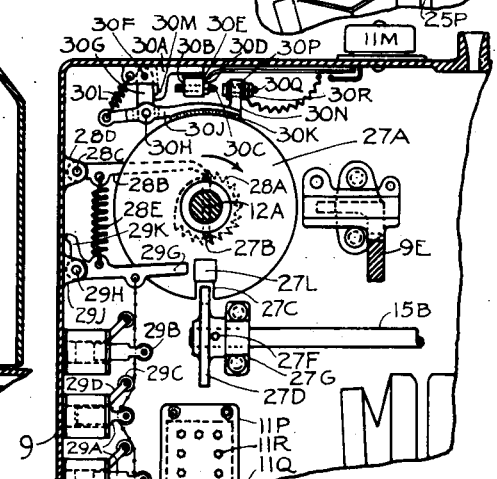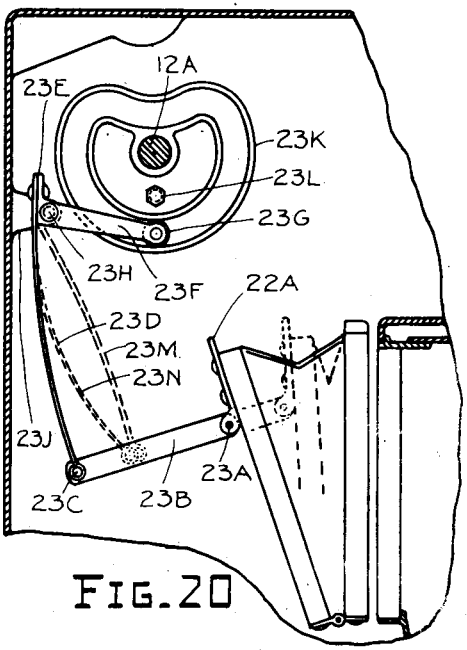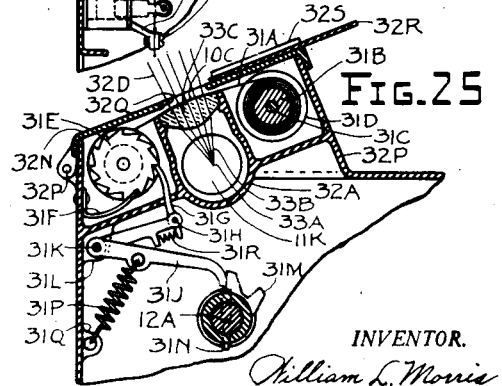

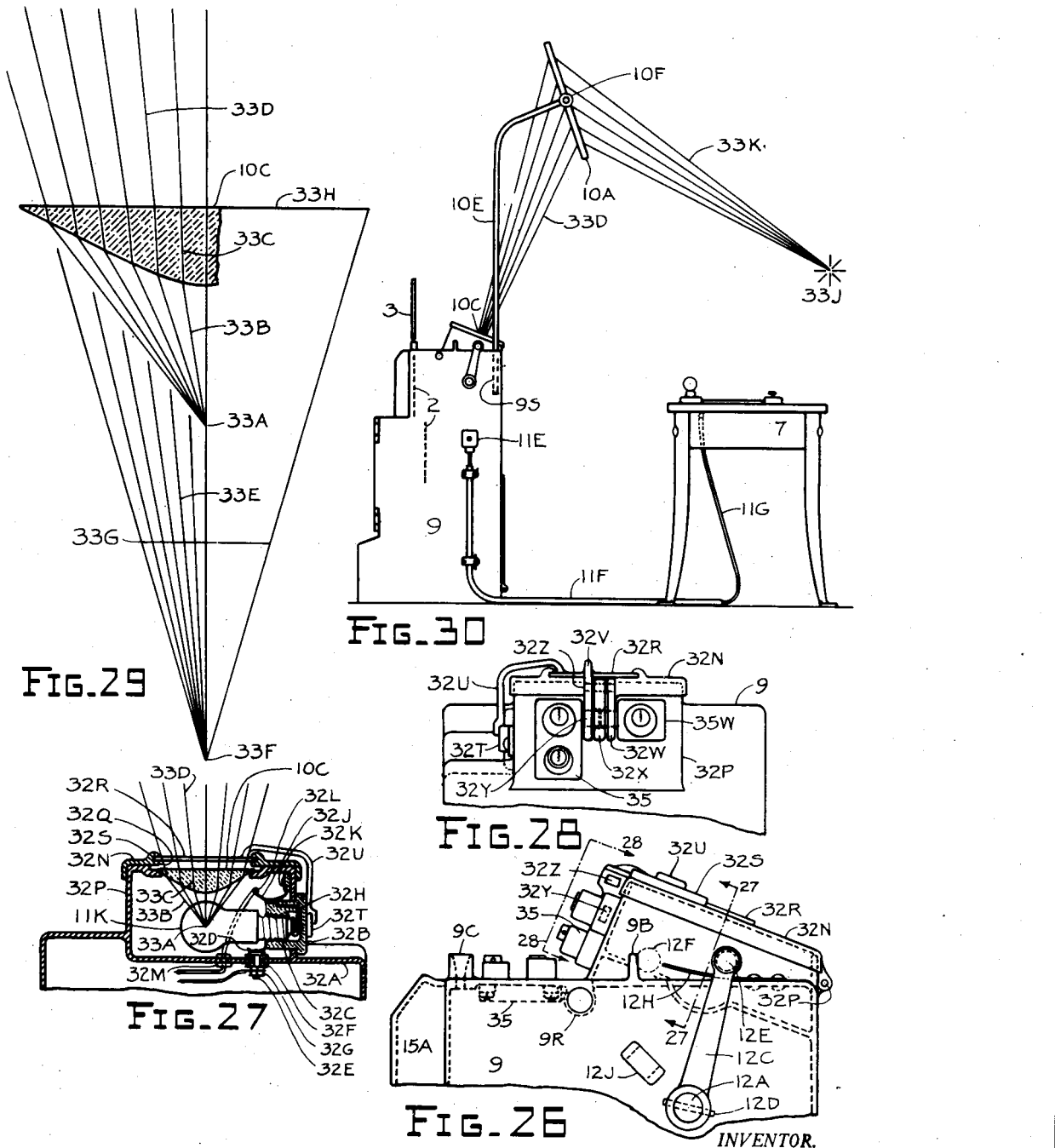

Aug. 20, 1935. W. L. MORRIS 2,011,588
VOTING AND BALLOT COUNTING SYSTEM AND APPARATUS
Filed Jan. 13, 1930 9 Sheets-Sheet 8
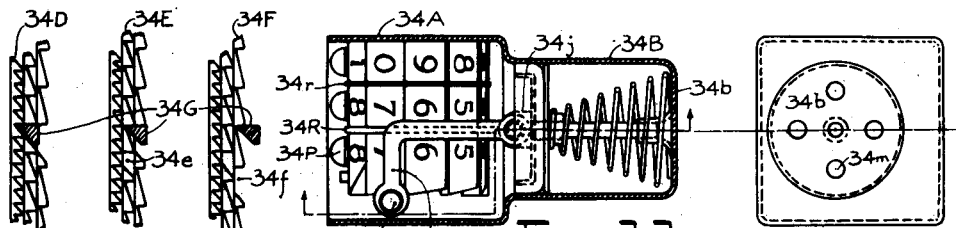
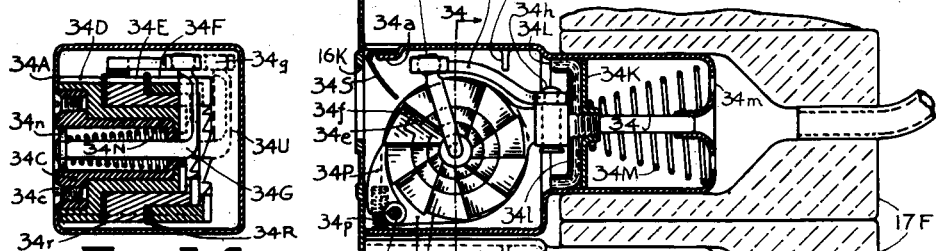
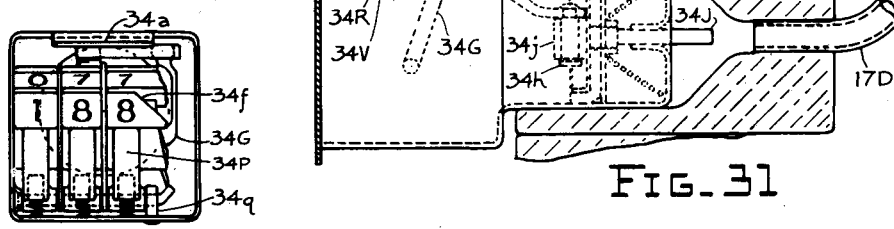
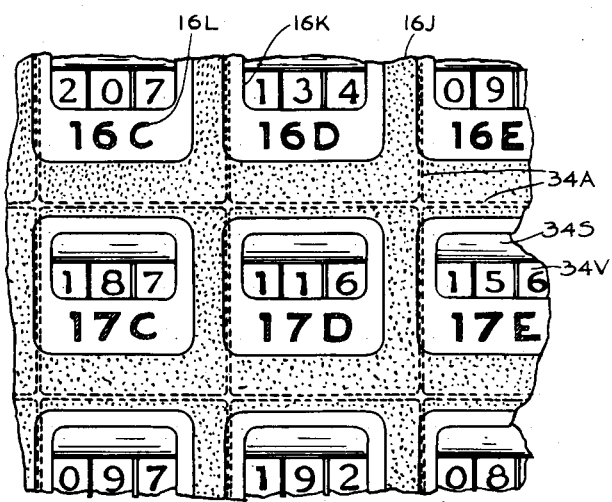
INVENTOR.
William L. Morris
Kent W. Worrall
ATTORNEY.

Aug. 20, 1935. W. L. MORRIS 2,011,588
VOTING AND BALLOT COUNTING SYSTEM AND APPARATUS
Filed Jan. 13, 1930 9 Sheets-Sheet 9

INVENTOR.
William L. Morris
ATTORNEY.

Patented Aug. 20, 1935

2,011,588

UNITED STATES PATENT OFFICE 2,011,588

VOTING AND BALLOT COUNTING SYSTEM AND APPARATUS

William L. Morris, Chicago, Ill.; Laura Bell Morris, executrix of said William L. Morris, deceased Application January 13, 1930, Serial No. 420,550

24 Claims. (Cl. 235—56)

This invention relates both to the method of casting and counting of ballots and to the equipment employing this system.

Among the objects of the present invention are: to provide a ballot counting system and apparatus in which the deposit of ballots is controlled from a distance; to visibly display the signature of a voter; to provide a ballot shield; to test ballots for thickness, position and stickiness; to destroy the sequence of ballots as deposited; to provide means for correcting errors in punching a ballot card; and in general to produce a system and apparatus which operates as herein shown and described.

In the consideration of a balloting system, dependability of the count is the prime consideration, and for all the public is most keenly interested in honest elections, the outstanding element of interest is the effect it will have on the different opposed political groups and the individual politicians.

As compared with the voting machine, the amount and cost of the equipment is very much less, its performance is much more dependable, less skill is demanded of the voter, it is fully as rapid in its performance, requires less help at the voting place to operate it and only about one-fifth as many machines are required, each being much simpler than a voting machine and requiring less upkeep expense.

The totals, after the closing of the polls, are displayed much the same as a voting machine but special ballots are used that permit machine counting and these ballots are retained within the counter and out of the reach of those in the voting precinct.

The ballot receiving containers are sealed by the precinct judges and the ballots are removed for recount only at the election commissioners' headquarters and in the presence of the judges.

Registration books may be used, the registrant signing his name in each book, either at the precinct or at headquarters. The ballots are in the form of cards, and in each booth is a punch, and instead of marking a cross for each candidate voted, a hole would be punched in the indicated place.

The voter upon reaching the counting machine with his ballot perforated ready to cast, signs his name on the reel at the back of the counting machine and the machine operator throws the light switch which projects this signature in a greatly magnified form upon a screen in plain view of those in charge of the registration books.

The parties with registration books check the projected signature with the names or signatures in their books and each one if satisfied, presses his push button to release the counting machine so a ballot can be entered and counted. Whatever the number of registration books, the majority should be able to release the counting machine.

Those who do not approve the signature can make note on the registrant's line in their registration book, stating their objection, and as the tape of signatures goes to headquarters, this signature may be later investigated. Push buttons operated by the registration book keepers close an electric circuit in series with each release magnet through a signal lamp so the other keepers of books will know the status of signature acceptance.

When the machine counter is released, the ballot drops out of its shield into the machine, the heading of the ballot showing so that the machine operator knows it is properly placed.

The machine tests a ballot before it is dropped into the counting compartment and it is automatically held if the card is too thick or too thin, too sticky to drop, or if improperly placed. In case the card is held the machine must be reversed, and an alarm is given whenever machine is reversed, and by reversing, the card can be removed and inspected.

Whenever a ballot must be removed, there is something wrong and it would no longer be a secret ballot; as the voter would be at fault, secrecy would no longer be desirable, more particularly as all judges would hear the alarm and witness the removal of the ballot.

Each voter whose signature is refused has his ballot passed from the shield into an envelope which is sealed, he is required to sign his name to the envelope which would be dropped into the reject ballot box, and when the counting machine reached headquarters, these signatures would be passed upon. It would then be either dropped out of the envelope into a headquarters machine counter, thereby being kept secret, or it would be destroyed without removal from the envelope.

These counting machines are delivered to the voting precinct locked at all points. The locks permit but one opening and closing, which prevents manipulations at the precinct and when a counting machine is returned to headquarters, it would have seals bearing the signatures of the judges and these seals would have to be kept intact for the checking recount, the seals being used to guard against manipulation while at headquarters.

The counter door is non-transparent and back of this door is a glass door locked from the inside of the case at headquarters, through which glass the candidate counters can be read after polls are closed, but not before.

When the polls are closed, the total number of the cast and rejected ballots are known as this would show in the registration books and the machine shows at all times the total number of ballots cast and these totals should be entered on the totals return delivered to headquarters. Later, at headquarters and in the presence of the precinct judges, the number of ballots in the counter are checked with the precinct returns and the ballots then run through a checking machine to see that the counting machine sent to the precinct gave a correct counting.

The signature reel requires provision to prevent tampering with it, and to repair damage caused by deliberate damage to the tape while is being signed. A transparent, sized cloth would be suitable for the tape and signatures written with India or other intensely black ink.

Upon the closing of the polls, the reel box slide is locked, and after locking it can not be opened again without breaking the headquarters seal. A headquarters key is also provided. The judges place their signature seals on reel box after locking it.

Each machine counter is inspected at headquarters at a predesignated time, so that the authorized witnesses selected by the different political interests may be on hand. The sealing is done in their presence, their signature seals being placed at same time as the headquarters machine compressed seal is placed to be sure headquarters or those at headquarters did not tamper with the machine after its inspection. The witnesses would look for their seals when the machine is received at their precinct.

Each counting machine has its ward and precinct plate in place at the time of inspection so it can not be changed without unlocking a door and breaking the seals. Before sealing the machine, special note is taken that the different counter units are all at zero and there are no ballots in either compartment and none in the reject ballot box. The only way that one could reach the ballots or counters is to break the headquarters seal and have a headquarters key to open it, which would be made impossible without showing plainly that it had been done.

Special provision is made in the design of this machine counter so that at no time is it possible to have access to the space between the platens, as such access would enable a skilled operator familiar with the machine to manipulate the counters through a very small hole and the space between the platens.

The pneumatic operation of the counters can not be done in a way that they are fast or slow in action, as the bellows is free to take its full travel the instant it is released.

Signature seals are put on the operator handle, the counter door, the reel box, and the ballot box door; also on the reject ballot box shutter, so that if any entrance is made at headquarters, it is made evident to the different interests concerned.

The signature reel and projection devices may be made separate from the counting machine and if desired, placed on the registration book table.

When stating that ballot cards are for the election of candidates, it is also contemplated to use candidates numbers for referendum questions of yes and no, the instruction ballot stating in full just what these referendums comprise.

In referring to perforated ballot cards, it is understood that there are various other ways of marking the card for counting and instead of using a movement of air to operate the counters, other mechanical or electrical movements can be provided which would employ the combinations shown.

Ballot cards are tested in the shuttle for such conditions as cause them to stick between the platens and not be able to fall by gravity, but if found desirable, the card can be moved mechanically in a holder so that gravity is not necessary for its movement.

Furthermore, if desired, a time clock may be used that releases the operator handle and the reel box slide at the time the polls should open and then lock these and unlock the counter door for a short time after the polls close.

In the accompanying drawings, illustrating a preferred embodiment of the invention, Fig. 1 shows a fragment of an instruction ballot such as would be printed in daily papers, also tacked up in public places, to designate the candidates, or the questions, for which votes are to be cast;

Fig. 2 shows a reduced size of the most economical and quickest form of ballot to handle in the voting booth, making it necessary for the voter to select his candidates as given in the published sample ballot before he enters the booth;

Fig. 3 shows in full size a fragment of a ballot card with a square for each candidate or question and a means for closing improperly placed perforations by means of small stickers;

Fig. 4 shows in perspective the various parts and equipment required for carrying out this invention;

Fig. 5 is a face view of a ballot shield;

Fig. 6 is an end view of the same ballot shield which conceals the ballot while taking it from the voting booth to the counting machine;

Fig. 7 shows a diagram of an electrical system of lamps, magnets and alarm signal for carrying out the invention, current being taken from a lamp socket;

Figure 18:
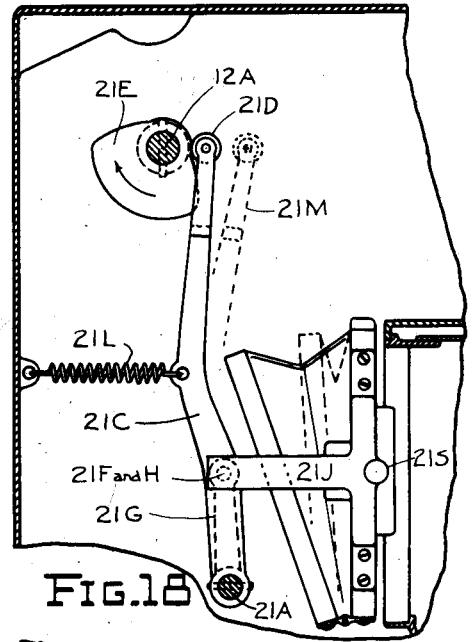
Figure 19:
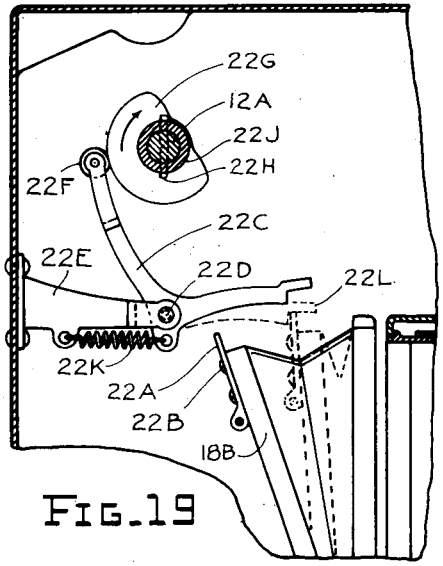
Figure 17:
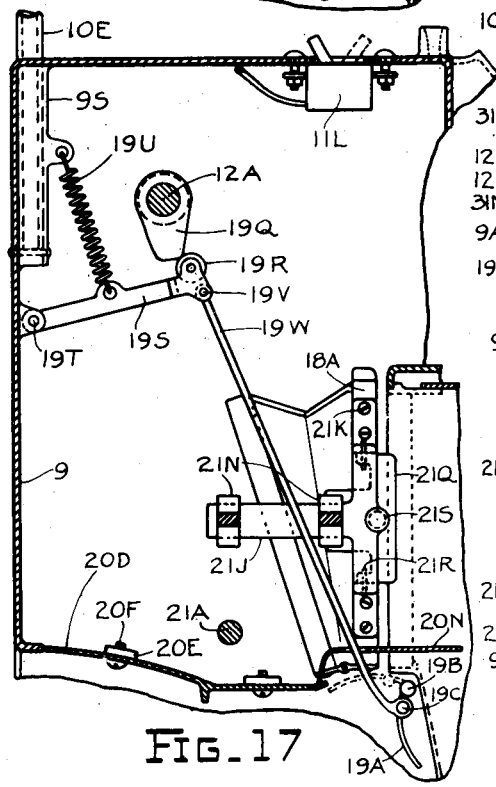
Figure 16:
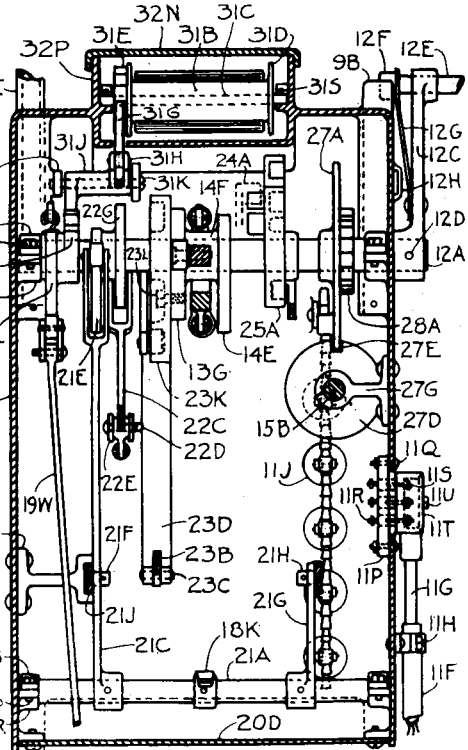

Fig. 8 shows an irregular section vertically through the ballot counting machine, including primarily a shuttle at the upper right hand for receiving and carrying the ballot to be dropped between the bellows and the counter platens, the counters to the right of these platens, the counted ballots below, the rejected ballots at the lower left corner, an operating cam shaft at the upper portion and the signature case projecting at the top and at the left hand side of the counter case;

Fig. 9 shows a front view of the right hand end of the ballot support and as vibrating selector for dividing cast ballots indiscriminately into two separate lots;

Fig. 10 is a front view of the machine counter with the shuttle cover opened and the operating mechanism locked;

Fig. 11 shows an irregular plan section through the counters and the upper part of the rejected ballot counter container door;

Fig. 12 is a top elevation of the counting machine;

Fig. 13 shows a plan section thereof approximately on a line just above the operating cam shaft of Fig. 8;

Fig. 14 shows a vertical section about on a line with the face of the bellows platen of Fig. 8;

Fig. 15 is a detail view of a thickness stop lever;

Fig. 16 is a vertical section of the machine approximately on a line just in front of the cam shaft 12A and the back portion of the signature reel;

Fig. 17 is a left side view of the bellows, showing principally the ballot card support and its operating mechanism;

Fig. 18 is a left side view of the platen closing levers, the rock shaft and its cam on the cam shaft;

Fig. 19 is a left side view of the bellows latching lever and its cam on the cam shaft;

Fig. 20 is a left side view of the bellows operating spring and its cam on the cam shaft;

Fig. 21 is a left side view of the shuttle and its ballot thickness stop, and its cam on the cam shaft;

Fig. 22 is a left side view of the parts shown in Fig. 21 but at their 60 degree or stop engaging position, this being the only mechanism shown away from the 0 or 360 degree position;

Fig. 23 is a left side view showing a ballot card positioning stop, and also the card dropping or stickiness stop;

Fig. 24 is a left side view showing the magnetic operator release, the non-return ratchet, the shuttle cover interlock and the reverse direction alarm, these parts being situated next to the right hand side of the machine case.

Fig. 25 shows a section from the left side through the signature reel drive, a projection lamp, and drive connections from the cam shaft;

Fig. 26 shows a side elevation of the right side of counter including the operating handle and its locking arrangement;

Fig. 27 shows a section of the signature reel projecting lamp and lens on a line 27—27 of Fig. 26;

Fig. 28 shows an outside elevation of the signature reel case on a line 28—28 of Fig. 26;

Fig. 29 shows light rays diverging to a projection screen, also a lamp and a refraction lens that takes a wide angle of rays from the lamp and delivers them as true radiant rays;

Fig. 30 shows an elevation of the right side of the counting machine, the judges' table, the projection screen, and the diverging light rays;

Fig. 31 is an enlarged front to back vertical section through the case and cylinder of one individual ballot counting unit, and below this a right side elevation of another counter unit, the top unit showing an elevation of the counter dials and a section of the rubber terminal for the air tubes;

Fig. 32 is a plan section through a counting unit case and a top elevation of the interior parts;

Fig. 33 is a rear elevation of the counter case.

Figure 47:
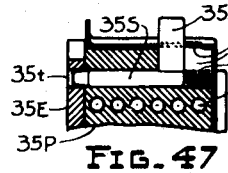
Figure 46:
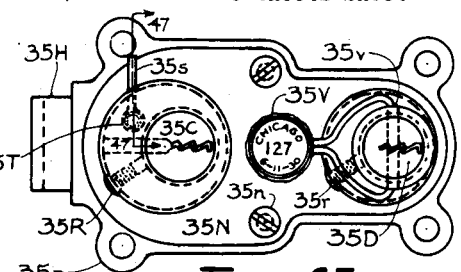
Figure 44:
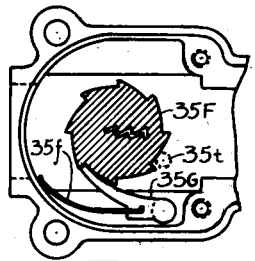
Figure 45:
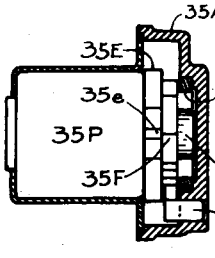
Figure 43:
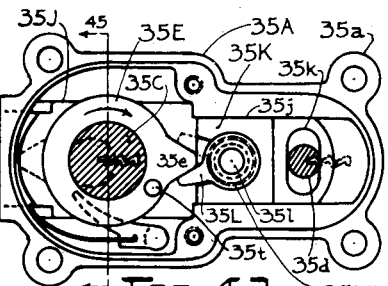
Figure 41:
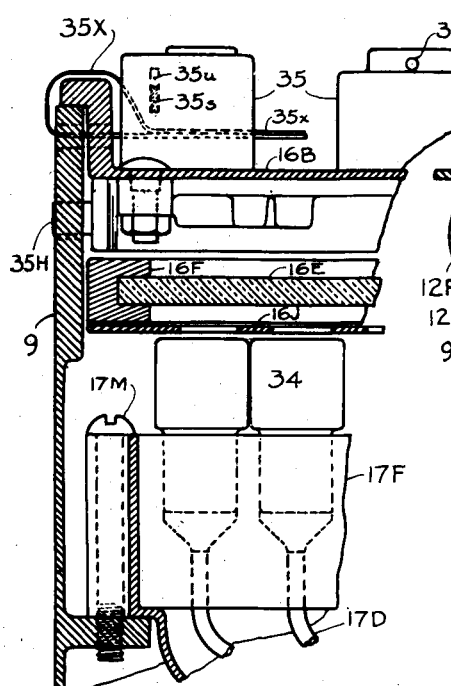
Figure 40:
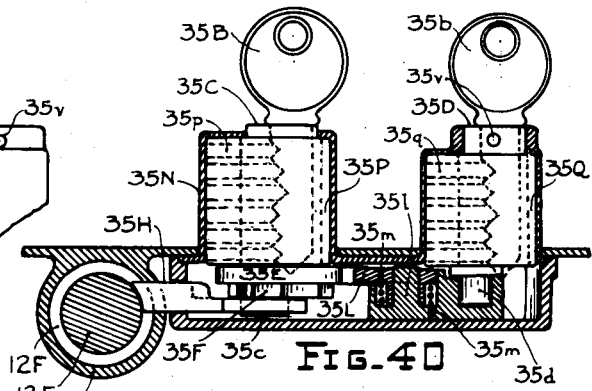
Figure 42:
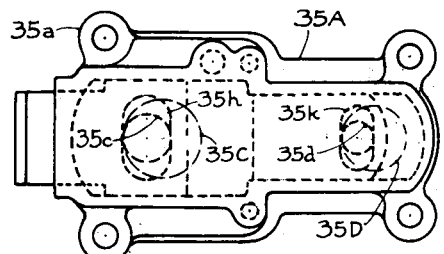

Fig. 34 is a vertical cross section through the counter dials on a line 33—33 of Fig. 30 with the driver in elevation;

Fig. 35 is a front elevation of a counter;

Fig. 36 is a diagrammatic view of a driver engaging the unit dial;

Fig. 37 is a diagrammatic view of a driver engaging the tens and the unit dials;

Fig. 38 is a diagrammatic view of a driver engaging the hundreds, tens and the unit dials;

Fig. 39 shows a fragment of an etched plate in front of the counters with the counter numbers showing through the openings;

Fig. 40 is a longitudinal section of a special counting machine lock approximately on a center line thereof, and as applied to locking the hand crank;

Fig. 41 is a side view of the lock as applied to the counter door and as also used for the ballot door;

Fig. 42 is an underside view of the lock of Fig. 40;

Fig. 43 is a top view of the lock with the cover and cylinders removed;

Fig. 44 is a top view of the lock with the bolt and top parts removed showing a non-return ratchet;

Fig. 45 is a section taken on a line 45—45 of Fig. 43;

Fig. 46 is a top view of a complete lock with a headquarters seal applied thereto;

Fig. 47 is a section taken on a line 47—47 of Fig. 46; and

Fig. 48 is a cam or movement chart of the various working parts used principally to make clear the description and timing of operations.

Referring now more particularly to the drawings, the invention is described by reference to its component parts or assemblies, each of which is given a number, the detailed reference to the several features being designated by a letter in conjunction with the numeral. An index of the features and assembly numbers is as follows:

1. Instruction ballot.
2. Standard ballot card.
3. Ballot shield.
4. Ballot punch.
5. Voting booth.
6. Writing desk.
7. Registration book table.
8. Registration book.
9. Machine counter case and many integral parts.
10. Projecting lens and parts above it.
11. Wiring system and electrical parts.
12. Manually operated cam shaft and drive.
13. Outer or front shuttle plate and its drive.
14. Inner or back shuttle plate and its drive.
15. Shuttle plate cover and its hinge shaft.
16. Counter door and etched number plate.
17. Counters and their holding frame.
18. Bellows and bellows air relief.
19. Ballot card support and uncontrolled discharge.
20. Ballot box door and separating partitions.
21. Platen closing operator and cam and side closing checks.
22. Bellows latch and cam.
23. Bellows spring and operator.
24. Shuttle thickness gauge stop and operator.
25. Ballot stickiness gauge stop and operator.
26. Ballot placement gauge stop and operator.
27. Shuttle cover interlock.
28. Non-return ratchet mechanism.
29. Magnetic operator release and cam.
30. Reverse alarm.
31. Signature reel, tape, ratchets and ratchet drive.
32. Reel box extension to case and projecting lamp parts.
33. Projecting lens, rays, refraction and visual diagram.
34. Counter unit.
35. Double lock unit; single locks; headquarters and signature seals.

An instruction ballot sheet a fragment of one of which is shown in Fig. 1 is furnished to the voters and may be published in the daily papers has designating numbers 1A for each candidate and for each referendum question to be voted upon, with whatever information may be deemed advisable, and preferably in the same order as they appear on a ballot card 2 of Fig. 2 which shows a ballot card of half size.

The fragment of ballot card 2 shown in Fig. 3 is intended to be full size, a suitable size being 6 by 9 inches, and .015 of an inch thick.

A hole 2A is provided in the ballot card for the purpose of insuring proper placement and register of the card in the counting machine.

Various lettering directions and instructions 2B are printed on all ballots and would be suitable for all elections and localities. The lettering designated as 2C is from a rubber stamp, a different stamp being required for each ward and each precinct, the W indicating the ward and P the precinct, and the date would be changed for each election, the ballots being stamped as delivered to the voter.

The system of numbering the candidate squares on the card 2 as shown by Fig. 2 is by letter from left to right and by numbers from top to bottom, there being 280 squares one for each candidate or proposal; but by using 10 vertical columns and 28 horizontal rows, all squares would be in numbers and readily located, the left hand column reading from the top down, as 0, 10, 20, etc. to 270.

Perforations 2D as shown in Fig. 3 are made in each of the candidate squares by the voter for each vote; if he makes a mistake or wishes to change his vote before turning in his card, he closes the perforation by means of a small gummed sticker 2E, the material for the stickers being very tough and about .003 inch thick, the thickness being too slight and surface too small to operate the machine stop that gauges card thickness.

A ballot carrying shield 3 is shown in Figs. 4, 5 and 6, made of some firm material that will hold its shape under rough usage. It is open at both ends and cut away at the top enough to show the heading 2B of the ballot card as shown in Fig. 5, but not cut out enough to expose perforations made by voter. A spring clasp 3A shown in Fig. 5 is used to pinch the ballot card against the back face of the shield 3 so it will not fall out except when the pressure of the clasp is withdrawn. Printed directions 3B on the ballot shield are for the guidance of the voter.

A ballot punch 4 is shown in Fig. 4 attached to a shelf 5B in the voting booth. A handle 4A is at the upper end of a punch spindle 4B to pierce a ballot card as the voter wishes to vote. The booths 5 in Fig. 4 are carried on a framework 5A and this framework carries a shelf 5B that supports the punch 4. A cup recess 5C in the shelf 5B is provided to hold the round shut-off stickers 2E shown in Fig. 3. Curtains or fabric 5D for the booths may be any material that is not transparent, preferably held to the framework 5A by rings 5E.

A stock case and desk 6, shown in Fig. 4 has an open back and shelves to hold ballot cards 2, envelopes 2F for rejected ballots, and the ballot shields 3, with an ink well 6A and a pen 6B on top.

A judges' table 7 shown also in Fig. 4 has removable metal angle shaped legs 7A secured with bolts 7B. One of the voters' registration books 8 is on the table and has place for registrant's signature 8A and his number 8B.

Signature projecting devices are shown in Fig. 4 as assembly 10, comprising glass screen 10A to receive rays 10B at one side and also be visible on the other side to those in charge of the registration books 8, the rays leaving the signature at projecting lens 10C, and appearing on the screen as 10D; the screen 10A is supported by columns 10E secured to the screen by thumb nuts 10F and sitting in sockets 9S of the case 9. A ballot shield 3 is shown over the machine counter in Fig. 4 as it would be held while delivering the ballot into the counter.

In Figs. 4 and 7 are shown the electrical system 11, including the current supply extension cord 11A and ordinary connectors 11B at the ends of the table. Standard push button switches 11C and standard lamps 11D are mounted on the table 7. Wire connectors 11E attached to the table 7 and case 9 may be the standard articles for this purpose, as shown in detail in Figs. 16 and 24, the part 11P being the inner half of a connector, attached to the case 9 with carriage bolts 11Q in square holes in case 9 to avoid tampering and having individual contactors 11R for engaging the contactors 11S in the removable portion of coupling 11T, these contactors having nuts or other means of connecting wires thereto, and if desired, a connector stud and nut 11U to hold the parts of the connector together. The conduit 11F, a seven-wire cable 11G and clamps 11H are shown in detail in Fig. 16.

Magnets 11J shown in Fig. 7 are part of the magnetic operator release system assembly 29 also shown in Figs. 16 and 24. An alarm buzzer 11M shown in Fig. 7 is a standard article and is also shown in Fig. 24 together with a special alarm switch 11N included in reverse alarm assembly 30. A projection lamp 11K indicated diagrammatically in Fig. 7 also appears in assembly 32 which is the reel box extension to case and projecting lamp parts shown in more detail in Figs. 25 and 27. Projection lens 10C as indicated in Fig. 4 is also found in Figs. 25, 27, 29 and 30. The projection lamp switch 11L is also found in Fig. 17, and may be any of the standard forms, the tumble switch shown being most suitable.

A vertical section of the counter case 9 on approximately the vertical center line from front to back is shown in Fig. 8, the front of the machine being at the right. This view shows the following details; the form of the case; the shuttle for carrying the ballot card from its entrance to the counter platens, and the cam drive therefor; the assembly of the counters with their platen to bear on the ballot card and the doors covering the counters; the bellows with its ballot card platen and its air release valve; the door to the cast ballots and the reject ballot compartment; also the variable delivery to either of the compartments for receiving the cast ballots (see Sheet 3½).

A name plate 9T is attached directly upon case 9 and is considered a part of the case. It has two studs projecting from it as shown in Fig. 8, the nuts being attached from the inside of case when the ballot door is open and the hinged partition is raised up out of the way. The lettering of one of these plates is shown in Fig. 12.

The other mechanisms partially or fragmentarily shown in Fig. 8 appear in detail in the later figures and the number of the assembly indicating these parts is noted in Fig. 8. The case sides, bottom and top are indicated generally as the assembly 9 and the special parts joined to the case and bearing this assembly number and the figure in which they are shown, are as follows:

9A—the half bearings for the cam shaft also shown in Fig. 8;

9B—a handle stop also shown in Fig. 26;

9C—an entrance mouth to receive ballot cards, Fig. 8;

9D—a back bearing for a back shuttle plate, Fig. 8;

9E—a cross bridge, Fig. 14;

9F—closing in flanges at the side of the shuttle, Fig. 13;

9G—a boss support for the cover shaft, Fig. 8;

9H—a shelf under the shuttle plates, Fig. 8;

9J—counter door hinges, Fig. 10;

9K—counter door lock bolt opening, Fig. 11;

9L—opening for the counter door seal, Fig. 11;

9M—a ledge under the counter doors, Fig. 8;

9N—a half bearing for the card support ends, Fig. 9;

9P—a half bearing for the vibrator and partition, Fig. 9;

9Q—hinge for the ballot box door, Fig. 11;

9R—a half bearing for the platen rock shaft, Fig. 16;

9S—sockets for the screen columns, Fig. 12; and

9T—ward and precinct name plate.

The manually operated cam shaft drive assembly 12 and the shaft 12A, are shown in Figs. 13 and 16, with a lower half bearing 9A attached to the case 9 and caps 12a secured thereto with screws 12B. A handle lever 12C attached at one end to cam shaft 12A by a pin 12D has at its other end a sliding handle 12E, the inner head 12F being pressed inward by a spring 12G so this head 12F will stop the handle when it comes in contact with the stop 9B attached to the case 9 as shown in Figs. 16 and 26, this being the position at which a ballot card can be entered into the counting machine.

A spring stop 12H shown in Figs. 12 and 26 holds the handle 12E in a fixed position while a ballot card is being entered, even though the hand is removed from the handle. To continue the movement of the hand crank 12C, it is necessary to pull the sliding handle 12E out of engagement with stop 9B and 12H as shown in Fig. 12. The locking features for this operating handle are shown in Figs. 26 and 40 and signature seals 35X may be passed through a clip 12J and over the handle lever 12C as shown in Figs. 12, 16, and 26. In Fig. 12, dotted lines 12K show the handle 12E pushed in and the double lock 35 turned and locked under the head of the handle collar 12F, the tube 9R also being shown in Fig. 26.

As shown in Fig. 8, the ballot cards 2 are entered into the counting machine through the mouth 9C when front and back shuttle plates 13A and 14A are open and in line with the mouth, the locked or starting position (0 or 360 degrees) of the operating mechanism being shown in Fig. 8 and likewise it is the position shown in other figures for all the different movable parts with the single exception of Fig. 22 which is 60 degrees past the starting point. The flange 13a of outer shuttle plate 13A keeps the mouth 9C closed while the machine is in its locked position. The shuttle plate 13A is carried in the guides formed in support 9E and on the ends of the Y shaped double support 13B which passes through the bosses 13C at the sides of this plate and is secured to the support by nuts 13D. The inner end of this support 13B carries a cam roller and a pin 13F that bears against cam 13G.

The inner shuttle plate 14A as shown in Figs. 13 and 8 has a central boss 14a to which the single support 14B is attached at one end by a pin 14C and at its other end is a cam roller and a pin 14D bearing against cam 14E. The two cams 13G and 14E are connected with hub 14F which is better shown in Fig. 16, and through the hub are attached to the cam shaft 12A. The arms 14G and 13H are extended from their respective supports 13B and 14B and a tension spring 14H is connected to these arms to draw cam rolls 13F and 14D to their respective cams. The projecting support 14J is attached to support 14B and slides in its bearing 9D attached to case 9. The other end of support 14B is carried in the cross bridge 9E that is attached to case 9 and better shown in Figs. 13 and 14.

A handle 13J shown in Figs. 8 and 10 is for pulling the outer shuttle plate to the indicated position 13K when the shuttle plate cover 15A is opened as shown in Fig. 10. This would be done when it became necessary to remove a faulty ballot. The indicated shuttle position 13L as partially shown by dotted lines in Fig. 8 is that assumed when the shuttle plates are in line with the ballot receiving mouth 9C. The back shuttle plate has side flanges 14K, shown in Figs. 10 and 13 which fit closely within the closure flanges of case shown 9F in Figs. 10 and 13. The opening 13M in Figs. 8 and 10 is to permit a machine operator to see the heading of a ballot card 2B. An opening 13N in Fig. 10 is the clearance hole for a position tester to pass through after passing through a registering hole in a ballot card. An opening 13P is for the stickiness indicator to pass through if a card has dropped out and to stop the mechanism if a card fails to drop clear thereof. The shuttle plates 13A and 14A have cover faces 13Q and 14L (see Fig. 13) that aid in holding a card in the shuttle if it is sticky.

A shuttle plate cover 15A is attached to a hinge shaft 15B with a pin 15b, supported at its outer end in boss 9G attached to case 9 as shown in Figs. 8 and 13. At the inner end of hinge shaft 15B and located under cam shaft 12A there is a cover locking device later shown and described under the shuttle cover interlock, assembly 27. At the top of cover 15A there is a glass window 15C and a retaining washer 15D held by screws 15E, as shown in Fig. 8. A shelf 9H under the shuttle plates is an integral part of the case 9.

In front of the counter assembly is a large opening in the case, with an etched number plate, a glass door and a locked metal door, all parts being included by the numeral 16, shown most fully in Figs. 8, 10, and 11. The double lock has an assembly number 35 and at the end of the specification it is fully described.

A hinge portion 9J (see Fig. 10) is part of case 9 and hinge part 16A is part of the metal door 16B connected with hinge pins 16C. This door has a lock 35 the bolt of which enters in opening in case 9K, as shown in Fig. 11. Seals 35X are described later and they are passed through openings in the case 9 and the door designated 9L and 16D in Figs. 10 and 11. Back of this door as shown in Fig. 8 is a glass 16E with a frame 16F, the upper portion of the frame entering a recess at the bottom of case shelf 9H and having a slot at the lower part of the frame into which the latch 16G enters when drawn up with a screw 16H, attached to a ledge of case 9M located under the doors, which can be released only from the inside of the locked case. The etched number plate 16J is entered in a recess at the underside of case shelf 9H just back of the glass door frame 16F and bears against the shoulder in bottom ledge 9M. This etched plate has as many openings 16K and different numbers for each counter unit 16L as there are counters, which are shown in detail in Fig. 39.

As shown in Figs. 8 and 10, at the upper right hand corner of the metal door 16B is an opening 16M thru which the glass door can be seen and through the glass the counter dials of the counter in the upper right hand corner which is the number 1P as shown by ballot 2 in Fig. 2. To prevent exposing the numerals of other counters, an obstructing partition 16N is extended to the glass to shut them off. This counter displays at all times the total number of ballots cast and the count is recorded through the hole 2A which is in each ballot card as shown in Fig. 2. If desired, the totals counter can be away from the back of door, with separate means for locking a small glass door for resetting the dials, and not interfering in any way with the ballot card numbers.

The counter unit assembly 34 is shown in Figs. 31 to 39 inclusive. The counter assembly includes all the connected parts that are removable from the case as a single piece and also the parts denoted by the assembly numeral 17, as shown in Figs. 8–10 and 11. A counter platen 17A preferably of rubber, has six horizontal rods 17B cast and vulcanized in the rubber to give it strength to resist compression when the platens are compressed onto a ballot card. Holes 17C are cast in the rubber platen into which the small metal tubes 17D are pressed. A metal frame 17E extends around the rubber platen 17A on all four sides, the ends of cast in rods 17B being secured to it. The counter units 34 are pressed into the openings of a rubber section 17F, each of which takes one horizontal row of counter units. Four vertical rods 17G are slidingly secured at the bottom to frame 17E and each rubber manifold 17F is connected to the outer end of its corresponding horizontal row of tubes 17D and then the rods 17G are raised through the holes for them in the manifold when so connected and pressed back into place. When all the manifolds 17F have been attached to their respective row of tubes 17D and the rods 17G are raised to their highest position, then the top plate 17H is secured to frame 17E with its screws 17J and nuts 17K at the top end of rods 17G, thereby completing the assembly 17.

All the numbers 16L in Figs. 10 and 39 and those on the instruction ballot 1A, Fig. 1, would not be used, they would vary for different elections and different precincts, and each counting machine may be designated for a certain precinct, and counter units may be placed only where candidates are assigned numbers, and the unused openings in manifolds 17F may be closed tightly with corks 17L, Fig. 8 so there will be no air leakage at these points.

The assembly 17, after being inserted into the case 9 is secured to the case 9 at top, bottom and sides with the six side screws 17M shown in Figs. 10 and 11, top screws 17N and bottom screws 17P shown in Fig. 8. In the platen 17A there is a hole 17Q shown in Fig. 8, which lines up with ballot hole 2A, shown in Fig. 2 and one of the tubes 17D runs from this hole to the top right side counter corresponding with 1P as shown in Fig. 2.

A bellows platen 18A, together with other parts of the bellows are movable together to and from the counter platen 17A, so that before the bellows is released to draw air through the ballot card, these platens are pressed together so tightly that there will be no air leaks at any joined openings, and the rubber platen 17A has slightly projecting edges around the port holes 17C to reduce the amount of bearing surface that it is necessary to compress as shown in Figs. 11 and 8. The perforated bellows platen 18A and the swinging bellows leaf 18B are ordinarily made of hardwood to better secure bellows cloth 18C to them with glue.

A ballot card guide 18D is rigidly secured to the top of the bellows platen 18A to present a smooth entrance for the ballot card between the platens 17A and 18A. Hinges 18E, Fig. 8, are attached to the bottom of bellows boards 18A and 18B with screws, being placed over the bellows cloth and used in place of hinge leather. A release valve 18F has a leather face 18G to seat tight around an opening 18H which extends through bellows board 18B, and a spring 18J keeps the valve closed except when the end of a trip lever 18K is raised by the movement of a rock shaft 21A. This trip lever is shown in Figs. 8 and 16.

A number of perforations 18L are shown in Figs. 8 and 14 which line up with those in counter platen 17A and register with the center of the numbered squares on ballot card 2, Fig. 2. A registering hole 18M lines up with the ballot hole 2A and has tube connection to the upper right hand counter 1P, the hole corresponding to the 18L holes shown in Fig. 14 being omitted at the upper right hand corner of the bellows platen 18A.

The support for the ballot cards while they are between the platens, together with the uncontrolled discharge of ballots into either of their receiving compartments are grouped under assembly numeral 19, the parts being shown in Figs. 8, 9, 14 and 17. A ballot support member 19A has end bearings 19B shown in Fig. 14 upon which it rotates, and the lower half of its support bearings 9N are attached to the case 9 and bearing caps 19D are secured to the lower bearings 9N with screws much the same as bearing cap 12a is secured to lower bearing 9A in Fig. 16. The extended arm 19E (Figs. 8 and 9) is to engage the vibrating diverter 19F which swings on its bearing ends 19G and is carried by supports 9P secured to case 9 and the bearing caps 19H secured to the supports 9P with screws 19J. These bearings 9P and 19H are double supports, carrying both the vibrator 19F and the dividing partition 19K. This partition divides the cast ballots into two lots and to facilitate the removal of the lot furthest from the ballot door, this partition 19K is hinged at top 19L as shown in Fig. 9 and has a hand hole 19M so it can be raised to reach the inner lot of ballots.

When the support 19A is released from its closed position, shown in dotted lines, it drops quickly and arm 19E comes in contact with and moves the diverter 19F to one side and lets go of it so it will vibrate back and forth across the path that the ballot card will take in falling, driven by the tension spring 19P which is attached to the case 9 and also to the vibrator as shown in Fig. 9, and as the vibrations and quickness of all are both variable, whichever side of a card the vibrator strikes, determines into which compartment it will fall. The spring 19P has very slight tension when in a vertical position and the vibrator 19F being of very light construction, stops immediately upon striking a ballot card. Ballot cards 2 are shown in Fig. 8 delivered to the two compartments.

The ballot support 19A is operated as shown in Fig. 17 from its cam 19Q on cam shaft 12A, the cam roller 19R being carried by a pivoted arm 19S which swivels on pin 19T carried by lugs attached to the case 9. The tension spring 19U is attached to a lug extended from case 9 at its upper end and to the pivoted arm at its lower end to hold the cam roller constantly engaged with its cam. Connected to the outer end of the arm 19S by means of a pivot pin 19V is a link 19W which is connected at its lower end with a driver pin 19C at the end of support 19A as shown in Figs. 14 and 17. The position of the cam 19Q on the operating shaft 12A is shown in Figs. 13 and 16.

A reject ballot box is shown in Figs. 8 and 11 which is also the door to give access to the counted ballots and these parts and the dividing partitions that keep ballots away from the upper mechanical parts are indicated with assembly numeral 20. The reject ballot box door 20A has a hinge 20a at its lower edge which is pin connected to the other member of hinge 9Q that is attached to the case 9. The back and sides of the ballot box 20B are part of the door 20A, circular in form at the top end so it will swing on its hinge and maintain a close top joint. The ballot door 20A is locked with a single lock having a seal the same as that shown in Fig. 46. The upper flange of door 20 has holes 20C shown in Fig. 11 for receiving signed gummed seals 35X and a like corresponding flange is attached to the case so the seals encircle both. The opening 20P shown in Figs. 8 and 11 are for the reject ballot box seals. A dividing partition 20D forms the top of reject ballot box and is attached to lugs 20E secured to the case with screws 20F, having a lip 20G to insure against an open joint.

At top of the reject ballot box is a shut-off receiver 20H substantially the same as that used for mail boxes, and to serve the same purpose; the dotted position 20J (Fig. 8) showing the open or receiving position of the shut-off swinging on pins 20K. The curved top of door 20L is an integral part of door 20A. Some rejected ballots contained in their concealing envelopes are designated 20M.

In front of the horizontal shut-off partition 20D and alongside the bellows and counter assembly are two side shut-off partitions 20N as shown in Figs. 11, 14 and 17 and they are permanently attached with rivets to the case 9.

Under numeral 21 are included the assembly of the platen supporting and closing devices and the side checks that are operated by this same mechanism. A rock shaft 21A shown in Figs. 8 and 16 is supported in bearings, the lower half bearing 9R being attached to the case 9 and bearing caps 21B are attached thereto with screws 21b. A main operating lever 21C is shown in Figs. 16 and 18 and fragmentarily in Fig. 8 and at its upper end it has a cam roller and pin 21D that engages with its cam 21E. The location of this cam on the operating shaft 12A is shown in Figs. 13 and 16. The lever 21C engages a pin 21F and is extended downward and pinned to shaft 21A. At right side of the bellows 17, Fig. 16, a short lever 21G is pinned to the shaft 21A at its lower end and the upper end connected to the right hand pin 21H which is the same as pin 21F. These pins and levers are also shown in Fig. 11, and the T shaped hangers 21J that are attached with screws 21K to the bellows platen 18A are shown in Fig. 17. These T shaped hangers 21J have pins 21F and 21H permanently secured at the end, as shown in Fig. 18. A spring 21L is attached at one end to the lever 21C and at the other end is secured to a lug in case 9, the tension of the spring keeping the cam roller 21D in contact with cam 21E. A dotted outline 21M of the long lever shows the position assumed when the platens are closed. Riveted to case 9 as shown in Figs. 11, 14, 16 and 17 are the bearings 21N in which the T shaped hangers 21J slide and support the bellows 18. The two front bearings 21N have an inclined cam end 21P as shown in Fig. 11 and carried within the hanger 21J and between it and the bellows platen 18A are the side closing checks 21Q which compel the ballot card to take a fixed position so the air holes in the platens will register with the perforations in a ballot card. As shown in Figs. 11 and 17, the check 21Q is pivoted in hangers 21J on pins 21R and bears on cam ends 21P by the pressure exerted upon it by the coil springs in the cups 21S formed as part of hanger 21J. The checks receive their full travel just before the platens exert pressure on the face of the ballot card.

When the bellows 18 is closed, it forces out the confined air and is latched in the closed position and while so latched, the bellows opening spring is given its full tension for opening the bellows the moment the latch is released. Suction is used rather than pressure, so air passes from the counters, through the perforations and then into the bellows. If by intent or accident, impurities are delivered to the holes of the ballots, these impurities will go to the bellows which has a low down outlet through which they will be blown out, to avoid carrying these impurities into the small air tubes and counters.

The bellows latching mechanism is indicated by number 22, (Fig. 19), the latch connecting tip 22A being attached to the bellows board 18B by screws 22B. A latch lever 22C is pivoted on pin 22D in its supporting bracket 22E riveted to the case 9. At the upper end of this latch lever 22C is the cam roller 22F which bears upon the cam 22G with a pin 22H in hub 22J for securing the cam to the operating shaft 12A. The location of this cam 22G on shaft 12A is shown in Figs. 13 and 16, the hub 22J being common to this cam and to the platen cam 21E shown in Fig. 18. A spring 22K is attached at one end to support 22E and at the other end to lever 22C and holds cam roller in contact with the cam. The dotted outline 22L, Fig. 19, shows the position of the bellows and latch when held by the latch.

The bellows spring mechanism 23, has a connection with the bellows by means of a pin and ears 23A formed at the lower end of latch connecting tip 22A. A push and pull link 23B is connected to the pin and ears 23A at one end (Fig. 20) and has a pin 23C at the other end to which the end of a spring 23D is attached, this being also shown in Fig. 16. The spring 23D has its stresses reversed and is attached to the ear 23E at the end of cam lever 23F by a rivet as shown in Figs. 13 and 20. The other end of cam lever 23F carries the cam roller 23G. The cam lever 23F is carried on a pivot pin 23H which is supported in two lugs 23J attached to the case 9 as shown in Figs. 13 and 20. The cam roller 23G engages the double faced cam 23K which is mounted on shaft 12A and lays against cam 13F to which it is secured by a cap screw 23L as shown in Figs. 16 and 20. In Fig. 20 the dotted position 23M is that of the spring 23D while forcing bellows shut and 23N designates the position with full tension on the bellows link 22B while the bellows is held shut by latch 22C as shown in Fig. 19.

A ballot card thickness gauge which constitutes an escapement or a stop is actuated by the relatively positioning of the shuttle plates; that is, the distance they are held apart by the card. A card that has been folded will not count accurately and it is likely to interfere with the other cards following it, and as a fold thickens a card and holds the shuttle plates apart, it would gauge the same as one that is too thick. There would be no object in depositing two ballot cards, as only one count would be made, but they may cause a stoppage and may prevent a correct checking of the total number of ballots cast, such as would show in the registration books and the total as shown at the counting machine. If a thin ballot is used, such as an instruction ballot cut from the daily paper, it may crumple and cause stoppage in the machine, and to avoid entering same between the counter platens, the machine would be automatically stopped, making it necessary to remove such a ballot. The thickness stop engages before the shuttle plates are over the opening to the counter platens, and the operating cam shaft 12A is reversed so the imperfect ballot may be removed.

The thickness gauging and stopping devices are numbered as assembly 24 and are shown in Figs. 21 and 22. Fig. 21 shows the 0 or 360 degree starting position the same as that shown by all other figures except Fig. 22 which shows the position of the parts when the operating shaft has been rotated 60 degrees from the position shown in Fig. 21, the shuttle plates 13A and 14A having moved to the entrance mouth 9C and back to about the starting position of Fig. 21 while rotating the shaft 12A the 60 degrees. A locking lever 24A is carried on a bearing pin 24B which is secured to the inner or back shuttle plate operator 14B and the locking lever 24A has a projecting nib or adjusting screw 24C that bears against the outer or front shuttle plate operator 13B, a spring 24D being attached at one end to the operator 14B and the other end to a projection from the locking lever 24A, thereby insuring constant contact of nib 24C with the operator 13B. This lever 24A is also shown in Figs. 13, 14 and 15 and in dotted lines Fig. 16. The top or striking end of this lever 24A is of hard metal with sharp ends 24E that just barely clear the sharp end hard metal strike projections 24F attached to and projecting from the three purpose cam 25A. The path between these sharp end projections 24F is just wide enough for the ends 24E of lever 24A to pass through when at the 60 degree position, causing a movement of these gauging points of about .020 inch for a variation of .005 inches between the shuttle plates, a suitable thickness for ballot card being 0.15 inches. When one of the points 24F enters between the two points 24E, it comes to a stop at the bottom of the V 24G at the end of stop lever 24A. The distance from the center of pin 24B to the bearing nib 24C can be made as short as desired to give a greater travel at the gauging points.

The stickiness stop parts bear the assembly number 25 as shown in Fig. 23 and this device is to prevent the continued movement of the operating shaft 12A past the 120 degree position, which is the limit of returnable movement and if a ballot card has not dropped clear of the shuttle, to be able to remove it. The shuttle plates have facings 13Q and 14L of material to cause a like or accentuated sticking effect as that which would arise in the counter platens when compressed on the ballot cards, and the ballot releasing opening between these faces 13Q and 14L is somewhat less than the open position of the counter platens so that the conditions imposed in the shuttle are more extreme than those that would follow. The shuttle is primarily a ballot card tester and a shut-off to the counters. The three purposes cam 25A, shown in Figs. 13, 16, 21, 22 and 23 has a cam face 25a noted on Fig. 23 for the stickiness tester lever 25B to bear against; this lever is pivoted on a pin 25C carried by lugs 25D projecting from cross bridge 9E.

A tester bar 25E is pivoted to lever 25B by a pin 25F and when a ballot card is out of the shuttle, this tester bar 25E is free to pass through holes 13P in the shuttle plates, and the projecting lug 25G of lever 25B follows the face 25a of cam 25A, the tension spring 25H keeping these parts in contact. This tester bar 25E is slidingly supported in a downwardly projecting extension 25J from the underside of cross bridge 9E, further shown in Fig. 14. When the tester bar 25E comes in contact with a ballot card that has not dropped out of the shuttle, it bears against the card by the slight pressure of a weak spring 25H and instead of the lever lug 25G following the cam face 25a until it assumes the position 25K as shown in dotted lines, the lug 25G follows the face 25L until it strikes the stop face 25M, it being necessary for bar 25E to be across the path of a ballot card to allow lug 25G to escape at 25N. The dotted position 25P of shuttle plates in Fig. 23 is about 90 degrees beyond the starting position. The cam pin 25Q attaches cam 25A to the operating shaft 12A.

It is possible to place a ballot card backwards in the machine, also upside down, but the counts would be incorrect and the counter totals would not agree with the later checking recount. At a fixed position on each ballot card is a hole 2A as shown in Fig. 2 and if a card is entered so this hole is at the left side or at the bottom, there would be no place for the positioner pin to pass through unobstructed. The placement tester assembly is numbered 26 and is shown in Figs. 23, 13 and 14. As shown in Fig. 23, the three purpose cam 25A has a stop 26A and a cam face 26B to engage with a placement lever 26C. This placement lever is carried on a pin 26D supported in a lug 26E projecting from cross bridge 9E. The tester pin 26F is slidingly supported in a boss 26G at the back of the back shuttle plate and a hole 13N in the front shuttle plate permits the tester pin 26F to pass through. The tester pin 26F is connected to a lever 26C by a pin 26H and a spring 26J draws the pin into the shuttle plates as far as the travel limiting stop 26K will permit. A side projecting lug 26L is also cam faced and either strikes the stop 26A when a ballot card is improperly placed, due to its contact with end of tester pin 26F, or it passes over the top of this stop and enters the cam opening 26M and comes in contact with corner 26N which engages the top of lug 26L and withdraws the pin 25F to the dotted position 26P to be out of the way of a ballot card just before the shuttle plates release the ballot card to drop into the counter platens and while the shuttle plates are in the dotted position 26Q of Fig. 23. When a ballot card is entered in the shuttle, the pin 26F is in the position shown in Figure 23 due to the stop 26K and the spring 26J, and the shuttle would be withdrawn from the pin 26F so that the end of the pin lies within the boss 26G and out of the way.

Numerous mechanism as shown in Fig. 24, the operating shaft 12A being common to all. The hinge shaft 15B is also shown in Figs. 8, 10 and 13 and is the hinge for shuttle cover 15A. This cover can be opened only when operating shaft 12A is at the 0 or 360 degree position. When operating shaft 12A is key locked for transportation, it is in the 60 degree position, which, by the operation of the interlocking discs shown in Fig. 24, causes cover 15A to be locked. This interlocking mechanism assembly 27 is as follows: the operating shaft 12A has a disc 27A attached to it by a pin 27B and there is a notch or groove 27C in the periphery of disc 27A into which another notched disc 27D extends, the notch 27E in disc 27D being shown also in Figs. 14 and 16. These notches of the two discs coincide when the operating shaft 12A is at 0 or 360 degree position and when the cover 15A is closed. Either of these discs can be rotated from this position and when rotated, the solid portion of one disc prevents the rotation of the other one. This prevents access to the ballot receiving opening over the counter platens shown in Fig. 8 as the back platen is in front of this opening when notch 27C permits movement of door 15, and the forward travel of the back platen is prevented by its cam roller bearing upon its cam. The back shuttle plate 14A could be pushed back when the door 15A is open if it were not for a latch 27H attached to hinge shaft 15B rising up behind the back of shuttle plate 14A when door is opened. When door 15A is open, no movement of the operating parts 12A is possible as the solid portion of disc 27D is in the notch 27C. The disc 27D has pin 27F to secure it to the cover hinge shaft 15B and a bearing 27G is riveted to the case 9 for supporting one end of this shaft 15B, as shown in Figs. 16 and 24. The latch 27H which rises behind the back shuttle plate 14A is shown in Figs. 8, 10 and 13 connected to hinge shaft 15B by a pin 27J and when the door 15A is closed this latch is out of the way so the shuttle plates can travel back to the entrance opening over the counter platens. As shown in Figs. 13 and 24, the cover 15A is secured by a pin 15b to the hinge shaft 15B and latch 27H is likewise secured to the hinge shaft by a pin 27J and the disc 27D is secured to the shaft 15B by a pin 27F, all of these parts rotating as a unit.

Provision is made whereby the operator shaft 12A can be reversed for the first 120 degrees of movement, up to the point where a ballot has been tested and positioned to drop out of the shuttle. Any movement from this 120 degree position must be continued in the one direction to the end of the cycle, being then stopped at this point from further movement in either direction. The non-return assembly 28 has a ratchet 28A secured to the disc 27A, shown in Figs. 13, 16 and 24. As shown in Fig. 24, a ratchet dog 28B is pivoted on pin 28C supported by lugs 28D attached to case 9. A tension spring 28E serves the two mechanisms, the non-return 28 and the magnetic release 29, as shown in Figs. 13 and 24. The magnetic operator release assembly is numbered 29 in Figs. 16 and 24 and includes the magnets previously given the number of 11J and shown in Fig. 7. A solenoid armature 29A is supported and guided by the interior portion of each magnet coil 11J. Each armature has a roller 29B at its outer end and other rollers 29C are attached to supports 29D extended from the coils 11J. A flat chain or ribbon 29E engages these rolls and is secured at its lower end to a projecting arm 29F and is attached at its upper end to a locking lever 29G. This locking lever is pivoted on a pin 29H supported in lugs 29J attached to the case 9. At the pivoted end of lever 29G is a stop arm 29K that limits the upward movement of lever 29G. The free end of lever 29G is the stop that engages a stop lug 27L attached to and extending from the face of the disc 27A, as shown in Figs. 13, 16 and 24.

In the 0 or 360 degree position, as shown in Fig. 24, the operating shaft 12A is locked with dog 28B from being turned backwards and by stop lever 29G from being moved forward. If there are three persons in charge of the registration books, then the foreshortening of chain 29E by two magnets would pull stop lever 29G down enough to miss the stop lug 27L and if five persons are in charge of the registration books, then three magnets should be required to release the stop. This can be controlled by adjusting the length of chain as held at the lower end by the clip and screws 29M at each side of chain.

The reverse alarm assembly 30 as shown in Fig. 24, has parts previously designated as the switch 11N in the electrical assembly 11 shown in Fig. 7 and this electrical system 11 notes the buzzer or alarm as 11M, which, being one of any of the standard articles for this purpose, no detailed description will be given. The specially constructed reverse alarm switch of assembly 30 which under assembly 11 is noted as 11N consists of a body portion 30A riveted or otherwise secured to the case so it can not be tampered with from the outside, and attached to this body is a block 30B carrying a contact screw 30C and wire terminal nuts 30D, the block 30B being supported by body 30A but insulated from it with insulation 30E. Hanging from a pin 30F in body 30A is a swing link 30G carrying on its pin 30H at its lower end a friction contactor lever 30J with suitable friction lining 30K attached to the contactor lever 30J, and a spring 30L for holding frictional contact with the outside edge of disc 27A. The stop 30M limits the forward movement of friction lever 30J due to spring tension and to forward movement of disc 27A. At the free or front end of contact lever 30J is a lug 30N, an insulating bushing 30P passing through this lug and a contact screw 30Q extending through this insulation with wire terminal nuts 30R. The contact shoe thus formed, when moved in the reverse or backwards direction, causes contacts 30C and 30Q to come together and close a circuit to the buzzer 11M giving warning that a ballot card is to be removed.

The signature tape, reels and driving mechanism goes under the assembly number 31 (Fig. 25) but does not include the projecting lamp, lens, nor additions to the reel case. A transparent signature tape 31A is about 4 inches wide, of a tough and transparent material, wound on one spool and drawn from a friction held spool by a ratchet feed on the other spool. As shown, the spool 31B is carried on a shaft 31C and has end flanges 31D. A ratchet 31E is attached to one end of one spool and has a non-return spring 31F and a driving dog 31G with a pivot pin 31H attaching it to a double rocker lever 31J, rocking on pin 31K supported in lugs 31L attached to the case 9. Motion is given to the rocker lever 31J by a double movement cam 31M attached to the operating shaft 12A with a pin 31N; this cam and the cam 19Q being joined and secured to shaft with the one pin. Contact between 31J and its cam 31M is maintained with the tension spring 31P connected to lever 31J and lug 31Q to case 9. A compression spring 31R keeps the dog 31G in contact with the ratchet 31E. Cotter pins 31S are placed above the bearing ends of the roll shaft 31C as shown in Fig. 16 to keep them down in their place in the U shaped bearings.

The reel box extension to case 9 and the projection lamp and its connections are under assembly 32. The projection lamp 11K in Fig. 7 which shows the electrical system assembly 11 is also shown by this same lamp number in Figs. 25 and 27. The reel box is shown in section in Figs. 16, 25 and 27 and in elevation in Figs. 8, 12, 26 and 28. The bottom of the reel box 32A is curved to accommodate the placing and removing of lamp 11K. As shown in Fig. 27, the lamp 11K has a socket 32B of bakelite or other insulating material and is removable with the lamp, having a metal threaded sleeve 32C cast in the socket 32B with an extension contact 32D that makes a sliding contact onto the head of screw 32E that is held in the insulator 32F with terminal nuts 32G to which wires are connected. Also cast in socket 32B is the other contact 32H which makes sliding contact on the blade 32J, one end of which is supported in the insulator 32K which is attached to reel case and the other end of the blade is rolled into an eye for making a solder connection to a wire 32L which passes through an insulator 32M to the interior of the case.

A cover 32N is connected to the reel case 32P with a hinge pin 32p. Above the lamp 11K is an opening 32Q in the cover 32N and over this opening is a slide 32R guided and held with the overlapping guides 32S. The lamp socket is held to its shoulder in reel case 32P by means of a raisable clip 32T, most clearly shown in Fig. 8, and this clip can be raised when slide 32R is out and clear of the opening 32Q through the cover. When the slide 32R is closed over the opening, the extension 32U attached to the slide will pass over the clip 32T and prevent it from being raised. Another extension 32V from the slide 32R and an extension 32W from the cover 32N and an extension 32X from the case 32P, all as shown in Fig. 28 have lock bolt holes 32Y through all three extensions and have holes 32Z to pass seals 35X through these same extensions, as shown in Figs. 8 and 28.

Under number 33 is included the assembly of the following: projection lens, the rays, refraction and the visual diagram shown principally in Figs. 29 and 30. The projection lens has been previously given the number 10C in Fig. 4 and was included in the projection assembly 10. The rays leaving the lamp at 33A are indicated on radial lines 33B in Figs. 25, 27 and 29 and the refracted rays through a glass lens 33C and the rays leaving the lens as 33D. The lens 10C, as shown in Fig. 29, has a flat top surface for the tape 31A to pass over and a bottom curvature to make refracted rays 33D coincide with the diverging rays 33E from the non-refracted rays of a lamp at 33F. The line 33G is the same distance from the center point of a lamp at 33F as the line 33H is from the center point of a lamp at 33A, but the area of utilized light rays on line 33G with a flat top and bottom lens is only about ¼ as large as when the rays leave at line 33H; if the light issued from 33F it would cover the same surface for signatures but the number of light rays passing thru would be only about ¼ as many. The chief functions of lens 10C is to utilize the greatest possible number of direct rays from the concentrated filament lamp. In either case, it is necessary to prevent the radiant rays from points other than the center of the lamp from passing through the lens 10C, which implies that no radiant rays can be utilized, and it would be necessary to coat a dull black all illuminated surfaces other than the lens and lamp.

In Fig. 30 is shown the path of related angular light rays from the lens 10C at the top of the counting machine 9 to the projection screen 10A and the rays from the screen to the eyes of those in charge of the registration books at the table 7, these parts being previously shown and numbered in Fig. 4. The approximate position of an attendant's eye is designated by a star 33J and by selection of the angular set of the screen 10A and clamping it at its support 10F, the rays 33K can be made to leave screen 10A at about the same angle as the rays 33D from the lens 10C, thereby displaying the signature in its true proportions. The screen 10A is transparent and light arresting, possibly glass with a ground surface. The screen holding pipe columns 10E, shown in Figs. 4 and 30 slide in sockets at the back corners of case 9, as shown also in Figs. 12 and 17.

The counter unit assembly is given the number of 34 and the details are shown on an enlarged scale in Figs. 31 to 39. Designations having a small letter and this number (34) pertain to a minor feature of the part having the same letter in capitals, to secure a greater number of designating characters. A square counter end portion 34A of the enclosing shell has a round piston portion 34B and this part is pressed into a rubber manifold 17F which has the air tubes 17D all as previously described and shown in Figs. 8 and 11 under assembly 17. This counter operates under a suctional pressure, the air entering the counters from back of the doors, being drawn in from the interior of case 9 and returned to it. The counters must operate under very low pressure, not exceeding one pound per square inch on the bellows to avoid undue stresses on the bellows and to avoid air leakage. The piston has but small area and the pressure exerted on the piston must move the parts besides compressing the spring for its return action, making it necessary to effect each movement with about 1½ ounces exerted.

Counters with many dials could not successfully employ the construction shown, which offers but a very slight resistance to movement, but with only 3 dials, this being ample for any voting precinct, the construction shown is perfectly operative with the low pressure. In this counter the unit dial does not drive the tens dial and the tens dial drive the hundreds dial, but the same driver moves in and out of engagement with one, two or three dials and whatever is moved is as a unit. The diameter of the dials determines the pitch of the 10 teeth at the end of each dial and the depth of tooth to engage all three counters is the minimum depth of each tooth plus its clearance times the number of dials. As this depth increases the angle of return becomes so great that much energy would ordinarily be wasted in the return movement of driver. As will be noted in Fig. 32 the link between the dial driver arm and the piston is on a considerable angle which greatly lessens the resistance to climb up over the steep angle of the three deep tooth.

The three dials all show at the cylindrical number face and also have their ends grouped, which implies that one must be carried by and over another, the entire group being carried on a stationary support member 34C, Fig. 34, attached to case 34A with screws 34c. The hundreds dial 34D rests directly on the support 34C and the tens dial 34E rests on the hundreds dial 34D and the unit dial 34F rests on the tens dial 34E. A driver 34G has a ball end tip 34g that engages with a link 34H, this link having a pin 34h rigidly secured to it pivoted in head 34j of piston rod 34J. Back of this head 34j is a threaded portion of piston rod 34J upon which thread a retainer washer 34K is screwed to confine between it and the head 34j, a cup piston leather 34L and its metal washer 34I. At end of the cylindrical portion of shell 34B is a head 34b having an inwardly projecting hub at its center to support the piston rod 34J and a spring 34M to return the counter movement when air is released and the air passed through holes 34m in the head 34b.

As shown in Fig. 34, the L shaped driver arm 34G is constantly kept engaged with the ends of the dials by the pressure exerted by a spring 34N upon the thrust washer 34n soldered to the end of driver 34G, this washer 34n guiding the movement of the end of the driver 34G in its endwise and rotative movement in support 34C.

When driver 34G is returned by the thrust of spring 34M, it bears upon the end of the three dials by reason of spring 34N and would turn them backwards if they are not otherwise held. The outer periphery of each dial as shown in Fig. 31 is in the form of 10 shallow ratchet teeth with the 10 counter numbers recessed in the face of each tooth. Bearing upon these number faces are three dogs 34P, each having a low tension spring 34p to keep it engaged, and they are carried on their support pin 34Q, one end of which is supported in a hole in the shell 34A as shown in Fig. 35 and other end supported in a lug 34q attached to bottom of shell 34A.

When pressure is exerted upon the end of one of the dials, it would tend to move also the one that it bears against, if it is in direct contact. To avoid this turning tendency, stationary washer plates 34R and 34n are placed between the dials and they extend out to and encircle the pin 34Q to keep them from turning. The thicker washer plate 34R, as shown in Fig. 32, lines up with the end of piston rod 34J and the washer plate is formed at this point as a stop, as shown in Fig. 31, to limit the outward travel caused by spring 34M. The other washer plate 34r is thin and encircles pin 34Q but has no back stop.

To avoid showing the next number, as 077 of Fig. 35, a shield 34S (see Figs. 31 and 39) is pressed over the lip 34a at top of shell 34A and under the shell at its ends, the length of shield being the same as the inside width of the shell 34A.

Figs. 36, 37 and 38 show in a diagrammatic way the toothed ends of the dials as they appear in the lower half of section Fig. 34. The teeth of the hundreds dial 34D are all alike and of uniform depth. The L shaped driver 34G has a V shaped section that engages the ends of the three dials. The number one tooth space 34e in the tens dial and the one tooth space 34f in the units dial have no bottom and are wide enough to permit the driver to enter through them both as shown in Fig. 38 and stop when bottomed in the tooth space of the hundreds dial, all three dials moving in unison from this position.

When the open tooth space 34f is over a closed bottom tooth space of the tens dial 34E as shown in Fig. 37, then the units and tens dials are moved ahead by the driver 34G engaging both. When the driver 34G bottoms in a tooth space of the units dial, as shown in Fig. 36, then only the units dial is moved. It will be noted in Fig. 38 that the angle of the teeth that the driver 34G must rise up and over to enter the following unit tooth space, shown as the next one below it, is very steep and if the force directed upon the driver head 34g were on a line parallel with the piston rod, much of the energy would be wasted in overcoming friction and a much heavier spring 34M would be required. By employing the construction shown, the force delivered by the driver on the line from 34h to 34g of Fig. 32 is no nearly on the same line as the angling faces of the three teeth in Fig. 38 that but little thrust is directed upon the teeth while forcing the driver over them into the next space. In limiting the travel of the driver 34G at the two ends of its stroke, it is desirable that the piston returns by spring 34M to a fixed stop position, as shown by the head 34j striking the back projection of the separator washer 34R, since the return movement of driver is in every case a rise over the top of a unit tooth. The movement of the piston by suction is varied in the three Figures 36, 37 and 38, as the angular position of the connecting link 34H is varied under these different conditions, making it necessary to stop the end of the link that is attached to the driver always at the same angular position of driver 34G as shown dotted in Fig. 31, so the dogs 34P will register with the periphery teeth of the dials. The enlarged head of link 34H that receives driver ball ends 34g is used as the striking member and a stop face 34T on a projection shown in Fig. 31 is provided, the stop face being parallel with axis of the dials and long enough to engage the enlarged head when the driver 34G is bottomed in any of the three different sets of dial teeth as shown in Figs. 36, 37 and 38.

The dotted position 34U of the driver in Fig. 34 is that assumed in passing over the points of the units teeth at the end of the units dial, these being the highest points for the driver to pass.

The face view of an etched plate 16J and the sight holes 16K and numbers 16L for each counter unit is shown by Fig. 39, these numbers appearing in Fig. 10 and as previously described in assembly 16. The outlines 34A in Fig. 39 represent the external faces of the square portion of the counter case. The numbers 34V are those showing on the different counter dials as they would appear in use.

The locking details are numbered 35 with a designating letter and the double lock has been given the assembly number of 35.

Whatever is provided to guard against the unlawful inclination and manipulation of some candidates can not be considered as a finally solved problem, for new means of defeating these provisions are bound to be devised. Such devices as keys and mechanical seal punches are so easily duplicated that they afford only partial security. Headquarters suspect those connected with the voting precincts and the precincts suspect headquarters. Each is anxious to put restrictions upon the other, and all are much alike.

Undoubtedly the most secure headquarters sealing would be by the use of such material and form as would require equipment to form it that would be so heavy or cumbersome that its transportation and use would be extremely conspicuous. These headquarters seals should bear the inspector's number and the date so the inspector can be held accountable for the condition of the machine counter.

The counting machines when returned to headquarters should be sealed with the signature of the precinct judges so when the contents of their machine is to be recounted for the final check, they can be present and see that their seals are intact and witness the recount.

The seals placed at headquarters would be on the one cycle, double locks so that these locks can be opened and closed only once, the precinct key remaining in the lock while it is unlocked. These double locks have been shown on the operating handle, the counter door and the reel case.

Instructions are given the precinct judges just how to handle the locks as the key could not be used in a lock the second time.

Separate keys are required for the signature reel case as they are in service or required independently of the one used for the operating mechanism and the counter door.

The main key is first placed in the handle lock and left there while the polls are open and in the unlocked position. When the polls are closed the handle is pushed into its tubular receptacle and locked in this position, then the key can be removed. The key would then be inserted in the counter door so door can be opened to expose the totals of the counters. These totals would be recorded by those authorized and delivered to headquarters with means for identifying them and copies retained for use in the checking recount. When the counter door is closed and lock turned so the key can be removed, the key cannot be again used until headquarters has released the lock.

The signature reel case also has a double lock so that when closed it cannot be opened again. It is necessary that the signature reels be kept intact after they have been signed by the voter in the voting booth and after the close of the polls, such signature seals should be placed on the reel box as will satisfy the precinct attendants at the time the ballots are removed at headquarters for the checking recount. The double, single cycle lock releases the slide that covers the signature opening in the cover and when this slide is moved outward it releases the projection lamp so it can be renewed if necessary. An ordinary lock is on the cover over the signature reels and this cover should not be raised unless by accident or intent, or unless someone has damaged the reel so it cannot be further operated; when this happens, the reel case would have to be opened and the reel tape either repaired or replaced, the portion of the removed reel with signatures being enclosed in an envelope noted with the conditions and signatures and deposited in the reject ballot box. A general rule may demand of all keepers of registration books to note the cause and conditions pertaining to the opening of the reel box while the polls were open.

Referring more in detail to the locks and seals under assembly number 35, 35A designates the body of the double lock shown in Figs. 40 to 47 inclusive. Both locks are of the regular Yale, cylinder type, and have the regular Yale type keys. The larger, six tumbler lock with key 35B is used at the voting place, the smaller five tumbler lock with key 35b being the headquarters lock.

Attachment lugs 35a are provided for attaching the body of the doors or case 9 by bolts that cannot be turned from the outside. The rotatable cylind member 35C of the large lock has an eccentric driver pin 35c at lower end; and the cylinder of the small lock 35D has an eccentric driver pin 35d at its lower end. A special collar 35E of the large lock has a projection 35e extending from it to prevent more than the one cycle or rotation, and a ratchet 35F prevents backward movement of lock, for if backward movement were permitted, the lock could be repeatedly unlocked and relocked. A spring 35f for the ratchet 35F is attached to a ratchet dog 35G that has a pivot pin end 35g engaging with the body 35A. A slide bolt 35H of the main lock may have a curved end to engage with the handle 12E and the collar 12F in the tube 9R attached to case 9 as previously shown in Figs. 12, 16 and 26 or it may have a square end as shown in Fig. 41 to enter the hole in case 9; the square end bolt would also be used for the ballot box door as shown in Fig. 8.

A slot 35h is provided in slide bolt 35H for movement by means of eccentric pin 35c, as shown in Fig. 42 and slot 35k in slide 35K is for the small lock eccentric 35d. The guide faces 35J in the lock body keep the bolt of the large lock in its proper alignment, and guides 35j do likewise for the small lock slide 35K. A swing stop dog 35L is shown as bearing against the small slide 35K, this being the position assumed after the main lock has been once unlocked and relocked, making one full 360 degree cycle and is then out of service.

A rigid stop on slide 35K would not permit a full 360 degree movement, and since the key throws the tumblers in a fixed line at the start and its stopping position must be on the same line, nothing less than a 360 degree turn of the cylinder and stop 35e would serve the purpose. When the small lock is given one turn with its key, the stop dog 35L is withdrawn from its contact with stop 35e, being supported on its pin bearing 35I and thrown to the released position shown by dotted lines in Fig. 43 by its tortional spring 35M, the ends of this spring being in holes 35m. The cover 35N has cylindrical projections to cover over the cylinders and the barrels or the locks, and has screws 35n, shown in Fig. 46, to hold the lock together when not attached at its lugs 35a. The tumbler barrel 35P of the large lock has tumbler pins and springs in holes 35p, and the small tumbler barrel 35Q has tumbler pins and springs in holes 35q. A screw 35R prevents movement of the large barrel in its case and a screw 35r prevents movement of the small barrel in its case.

In Fig. 47 is a slide bolt 35S with finger grip 35s and a hole 35T in a barrel 35P for the bolt to slide in, and a hole 35t in collar 35E for the bolt to engage. A spring 35U holds the slide bolt in engagement with a collar 35E and the narrow slots 35u allow for extension and movement of this bolt 35S from outside the cover 35N. This slide bolt is necessary to prevent any accidental closing or partial closing of the large lock, as the ratchet 35F prevents reversing it back again.

When the door is closed and all is ready to complete the movement of lock, then this slide bolt 35S is raised so the lock can be turned to the closed position and the key removed for use in the next opening and closing operation.

A seal 35V in Fig. 46 is formed at headquarters with a large or heavy machine, tools that would be too heavy and cumbersome for a vote manipulator to carry or use. A wire hole 35v extends through the stationary cover and also through the rotatable cylinder of the smaller valve, preventing a key from being entered while the seal wire is in the hole. If it were necessary for headquarters to correct faulty handling of locks at a voting precinct, they could send a man out to cut the seal wire and release the main lock and then pass a wire through, apply a gummed signature seal, and make a report.

A single lock 35W is also attached to the signature reel case cover (see Fig. 28) but has no special features or novel structure.

The gummed seals shown in Figs. 10, 11 and 41 are given the part number 35X and its gummed ends as 35x. These signature seals should be of very tough and durable material having strong adhesive gummed tips with soluble ink lines on their surfaces that will run and smear if the seals are wetted so as to loosen their ends. They would be used at the five different locked points as previously described.

The single lock 35Y for the ballot box door, shown in Fig. 28, is not opened except at headquarters and is arranged for the headquarters seal the same as that used on the double locks 35.

Operation

The general performance of the voter has been elsewhere described; this description relates to the operation of the counting machine only, which will be described in connection with the cam turning chart Fig. 48, which shows diagrammatically the relative movements of the various mechanisms throughout one revolution of the cam shaft and its hand crank assembly 12.

The starting or 0 degree position is the same as the 360 degree position and after each cycle, the shaft 12A is locked so it can not be moved either forward or back. To release this shaft 12A, it is necessary that the keepers of the registration books press their push buttons to operate the magnetic latch 29 and while the latch is open, the hand crank on shaft 12A can be turned to its stop 9B shown in Fig. 26 which is the 30 degree position on chart. As the shaft 12A is rolled away from the 0 degree position, the shuttle cover 15A, shown in Fig. 8, is locked by the shuttle cover interlock 27 as noted on chart.

The hand can be removed from the crank handle in this 30 degree position as it is held by spring stop 12H shown in Fig. 26, and the magnet latch can be released as it is held open by its engaging lug 27L, shown in Fig. 24.

The shuttle plates 13 and 14 at the 0 degree position are back of the ballot entrance mouth 9C and the mouth is closed with flange 13a as shown in Fig. 8, and at the 30 degree position the front shuttle plate 13 and back shuttle plate 14 have travelled to the ballot card entrance mouth and these plates are then open, as shown by chart, to receive the ballot card 2 which drops in between the shuttle plates as indicated at the lower portion of the chart. At the 60 degree position of the shaft 12A, the shuttle plates have travelled back about half way to the mouth of the counter platens and have come tightly together to measure the thickness of the ballot card and to give it a chance to adhere if it is at all sticky.

At this 60 degree position, the thickness stop 24 is in line to clear the stops 24F in Fig. 22 or come to a stop at 24G if the card is too thick or too thin, the stop position being shown by an arrow in the chart.

At the same 60 degree position, the placement stop 26 would be ready to engage lug 26A of Fig. 23 if the ballot card were bearing upon the end of the placement pin 26F and stop the machine at the point noted by an arrow on the chart.

Before the shuttle plates reach the mouth to the counter platens, the card support 19 would be in the up position which should be before reaching about 70 degrees, shown on chart as up at about 45 degrees.

Immediately after leaving the 60 degree position and while the shuttle plates are moving back to the mouth of the counter platens, the placement stop would move backwards or out of the ballot card so the card will not be held up on the tester pin, and be out of the card's way before the 90 degree position is reached so that card can be on its way to the counter platens at the 90 degree point. At this 90 degree point the stickiness stop 25 starts to move in toward where the card would be if it has not left the shuttle plates and comes to its stop at 120 degrees if the card is still there, as shown on the chart by an arrow.

If the card is out of the way, the stickiness stop passes across the path where the card was and continues in its cam path as shown in Fig. 23.

Immediately following this stickiness stop, the non-return ratchet 28 engages with its first tooth following the 120 degrees of toothless surface, as shown in Fig. 24, and the operating shaft 12A must continue in the forward direction from this point on to the 0 degree position.

If the stops have prevented the shaft 12A from going beyond the 120 degree position, then it is necessary to remove the faulty ballot, which has been improperly placed in the shuttle or was too thick, too thin, or too sticky to drop out. The operating shaft 12A must in this case be reversed to the 0 degree position so the shuttle cover interlock 27 will permit opening the cover 15, the reverse alarm 30, shown in Fig. 24 giving warning while so doing, so the judges can take note and make a report.

If desired, a counter (not shown) can be made part of the machine counter which will give the number of times the cover is opened. When the cover is open, the front shuttle plate can be pulled out to the position 13K shown in Fig. 8, which is far enough to give access between the shuttle plates to remove the faulty ballot and also to clean off the faces of the shuttle plates if found necessary.

If the ballot card has passed the tests and dropped between the counter platens, shown at bottom of chart as somewhere between 100 and 120 degree positions, then the counter platens and ballot side checks 21 close in on the ballot card and make tight air joints at the counter platens, being closed just before the 180 degree position.

While the counter platens are closing, the bellows spring 23 is compressed to close the bellows, starting and stopping at about the same time, and by the time the bellows is closed at the 180 degree position, the bellows latch 22 is down ready to snap over the bellows part 22A, shown in Fig. 19. The bellows valve 21 is released by the movement of the counter platen movement so it is closed when the bellows opens.

Immediately following the latching of the bellows at about 180 degrees, the bellows spring 23 is put under its full tension and reaches it at about 240 degrees and immediately following this the bellows latch is released, the bellows opening very suddenly, being fully open and counters operated before 270 degrees are reached. Soon after, about at 290 degrees, the card support 19 is released and is fully down before 330 degrees, and remain down until the next cycle is started by the next release of magnetic latch 29.

By the time that 360 degrees are reached, as shown at the bottom of the chart, the ballot card would have dropped in front of the vibrator 19F, in Fig. 8 and fallen to its receiving compartment.

The paper reel feed 31 is shown on chart as being fed, starting at 270 degrees and being fully moved just before the 360 degree position is reached, ready for the next voter.

The counter platens 21 and its side checks would start to open about the same time that the card support is dropped, all starting possibly 20 degrees after the bellows are entirely open. The bellows valve is open when platens are open at about 330 degrees.

After the ballot card has left the shuttle plates at the 120 degree position, it is immaterial when these shuttle plates start back to their half way position shown in Fig. 8 so long as they are there at the 0 degree position for the next cycle.

The stickiness stop 25 can also be returned toward back of machine any time after 120 degree and before the 30 degree position of the next cycle is reached.

The placement stop 26 can be moved to the front at any time after the 120 degree position is passed.

When the operating handle shown in Fig. 26 is to be locked, it will stand in the 60 degree position as noted by arrow under the chart, Fig. 48, and the shuttle plates will be in about the same place as the 0 degree position or that shown in Fig. 8, which closes the ballot card entrance mouth 9C.

This completes a full cycle of operations, the details of which are described in connection with the detailed description of the parts, and the machine is in readiness to receive the next card.

I claim:

1. A balloting machine having a counter to receive perforated ballot cards, means for registering votes through the card perforations, a shuttle open at the top and bottom, enclosed guides at four sides, in which the shuttle travels, a ballot receiving slot at the top of the guide at one end of its travel and an outlet to the counter at the bottom of the guide at the other end of its travel.

2. In a balloting machine for receiving cards having vote designating means, vote counters actuated by said means, means to reverse the machine for removing a defective ballot card without giving access to the counters, and signalling means actuated by reversing the machine operation when a ballot card is being removed.

3. A balloting machine for receiving cards having vote designations, vote counters controlled by said designations, platens between which the cards are delivered, and means for testing the stickiness of the ballot card by compressing it between the platens, the adhesion preventing it from being delivered to the counters if it adheres to the tester.

4. The combination with a perforated ballot card, of a balloting machine having pneumatic counters corresponding to the perforations, a pneumatic bellows and means for drawing air through the card perforations to operate corresponding counters, and manual means for actuating the bellows comprising a spring and a holder releasable after the spring is under full tension.

5. A balloting machine for receiving perforated ballot cards comprising stationary and movable platens with perforations corresponding to the ballot perforations, pneumatic counters connected with the perforations of one platen, a bellows connected with the perforations of the other platen to actuate the counters according to the perforations of a card gripped between the platens and guides at the edges of the card to close in upon a card before the platens close thereon.

6. In a balloting machine for cards having vote designating means, a card receiving opening, a counter compartment in the machine having an opening out of line with the receiving opening, and a shuttle movable sidewise to receive a card from the receiving opening and to discharge it into the compartment, the shuttle closing the counter compartment from the exterior in all positions thereof.

7. A balloting machine having a receiving opening for vote designating cards, a counter enclosed therein for receiving the cards out of line with the said opening, and a shuttle for receiving and transferring the cards, the shuttle and machine having visual means to show the heading of a card in the shuttle and in the machine without disclosing the vote designations on a card and preventing access into the machine.

8. A balloting machine comprising an opening to receive cards having vote designations, ballot testing means, ballot moving means, vote counting means, an operating member to give full forward movement to said means in regular sequence after a ballot passes the testing means, and means to stop this movement after failure to pass the testing means thereby permitting the operating member to be reversed and a defective ballot to be removed.

9. A balloting machine comprising an opening for receiving a ballot card, a counter compartment, a shuttle for receiving and conveying a card from said opening to the compartment, operating mechanism for testing cards and counting votes therefrom in regular sequence, and a stop adapted to cross the card compartment in the shuttle and engaged by a card therefrom operative to halt the mechanism if a card does not drop from the shuttle to the counter compartment.

10. A balloting machine comprising a card receiving opening and a counter compartment, a shuttle for receiving a card from the opening and conveying it to the compartment, operating means for the shuttle, means for contacting with a card in the shuttle to return the shuttle to its starting point as long as the card is in the shuttle.

11. A balloting machine comprising a ballot card receiving opening and a ballot counter, a shuttle for conveying the cards from the opening to the counter comprising separable testing plates, operating means for the shuttle, means for moving the plates apart to discharge a card to the counter, and means for locking the operating means when the plates are separated.

12. In a balloting machine, a sealed ballot box, a counter, means for receiving and testing a perforated ballot card, counting means depending for operation upon the perforations of a card and including visible counter indicators, means for delivering counted ballots to the sealed box, mechanism normally preventing access to the counters and means in the machine to give visual access to the counter indicators after the card receiving opening is sealed and not to the working parts.

13. A mechanical ballot counter, comprising a receiving opening, a counter for receiving ballots, a shuttle to deliver ballots from the opening to the counter, a cover for the shuttle, operating mechanism for the counter and shuttle, and means for interlocking the operating mechanism and the cover whereby the mechanism can be moved only when the cover is closed, and the cover can be opened only when the shuttle and operating mechanism is held at a location which prevents access to the counter for receiving the ballots.

14. In a ballot counting machine, a counting mechanism, a shuttle to support and convey ballot cards vertically therein, a top entrance opening in the case of the machine to receive the cards edgewise when the shuttle is at one end of its travel, and an opening in the machine case at the other end of travel of the shuttle coinciding with an opening at the bottom of the shuttle for admitting the card to a counting mechanism.

15. A structure in accordance with claim 36 including also a tester pin adapted to pass across the space occupied by the card and to actuate a stop if the card has not dropped by gravity out of the shuttle.

16. A structure in accordance with claim 36 comprising shuttle plates adapted to be brought together to bear against opposite faces of the card before it reaches the entrance to the counter, the distance between the shuttle plates controlling a stop mechanism if the thickness of the card is other than that for which it is set to prevent further movement of the operator.

17. A ballot counting machine having pneumatic counter mechanism, including an operator moving in one direction, a bellows for actuating the counter mechanism, an operator controlled means for operating the bellows and storing the actuating energy of the bellows, and a latch to retain the energized bellows having means actuated by the operator for releasing it, the parts being operated in the above sequence as stated.

18. The combination with a ballot counter and ballot discharge means, of receiving receptacles for the counted ballot cards, a vibrator partition in the path of card travel and between the receptacles, and means for setting the vibrator in motion prior to the time the card reaches the partition, the variation in the release of the partition and the time element of the dropping of the card causing by chance a break in the sequence of the cards deposited in any receptacle.

19. A balloting machine adapted to receive deformed ballot cards from a transportable concealing shield comprising means for registering votes through the card deformations, a shuttle for ballot cards having an inlet and an outlet, and an entrance mouth which registers with the shuttle inlet for discharging a ballot card from a shield into the shuttle inlet and prevents a shield from entering the shuttle.

20. In a balloting machine having an opening for receiving cards having designations of a voter's choice, a card shuttle comprising movable spaced plates, means for compressing an inserted ballot card between the plates to adhere thereto if a gummy substance is on the card, and a normally closed shuttle plate cover movable for giving access to the shuttle for removing a sticky card before it reaches the counter.

21. A balloting machine for receiving ballot cards with vote designations thereon, a ballot counter, means in the machine comprising spaced plates with opposite perforations for receiving the cards between them in a correct position, means insertable through the perforations and through a registering hole in a card for preventing the count of an incorrectly placed card, said means comprising a tester pin and stop mechanism directly in connection with the pin and operated when the pin engages a card between the plates to prevent further operation of the machine.

22. A balloting machine for receiving cards having vote designations, and means for gauging the thickness of an inserted card to prevent a card of other than predetermined thickness from being received and counted, said means comprising spaced movable plates and means for compressing a card therebetween, a lever actuated by the relative movement of the plates, and stop means to engage the lever and prevent further operation of the machine until the card is removed.

23. In a balloting machine for perforated ballot cards, upright stationary and movable platens with ballot counting perforations, pneumatic counters connected to the perforations of one platen, a bellows connected to the perforations of the other platen, means for delivering a ballot card between the platens at the top, a movable ballot support to uphold a card at the bottom of the platens, means to position a card laterally as the platens are brought together, and means to operate the ballot support to drop a card when the platens are moved apart.

24. In a balloting machine, means for receiving a ballot card perforated by a voter to designate his vote, counting means actuated through such perforations and including resiliently operated means to engage the face of a card, a resilient thickness gauge for stopping the machine if a card is uniformly too thick, the resiliently operated means yielding sufficiently so that the thickness gauge will pass a card with a small and thin correction covering thereon for a perforation in the card without operating the gauge to stop the machine.

WILLIAM L. MORRIS.